United States Patent
Gray

(10) Patent No.: US 6,184,333 B1
(45) Date of Patent: Feb. 6, 2001

(54) LOW-TOXICITY, HIGH-TEMPERATURE POLYIMIDES

(75) Inventor: Robert A. Gray, Cincinnati, OH (US)

(73) Assignee: Maverick Corporation, Cincinnati, OH (US)

( * ) Notice: Under 35 U.S.C. 154(b), the term of this patent shall be extended for 0 days.

(21) Appl. No.: 09/232,271

(22) Filed: Jan. 15, 1999

Related U.S. Application Data

(60) Provisional application No. 60/071,599, filed on Jan. 16, 1998.

(51) Int. Cl.[7] ................................................. C08G 73/10
(52) U.S. Cl. ........................ 528/170; 528/125; 528/128; 528/171; 528/172; 528/173; 528/174; 528/176; 528/183; 528/185; 528/188; 528/220; 528/229; 528/350; 528/353; 525/420; 525/422
(58) Field of Search ..................................... 528/125, 128, 528/171, 172–173, 174, 176, 183, 185, 188, 220, 229, 350, 353; 525/420, 422

(56) References Cited

U.S. PATENT DOCUMENTS

| | | | |
|---|---|---|---|
| 4,778,872 | * 10/1988 | Sasaki et al. | 528/176 |
| 4,913,759 | 4/1990 | Wright | 156/238 |
| 4,923,968 | * 5/1990 | Kunimune et al. | 528/353 |
| 4,939,235 | 7/1990 | Harvey et al. | 528/337 |
| 4,973,442 | 11/1990 | Harvey et al. | 264/503 |
| 4,978,737 | 12/1990 | Vora | 528/220 |
| 4,980,447 | 12/1990 | Khanna | 528/184 |
| 5,013,588 | 5/1991 | Lin | 427/397.7 |
| 5,041,526 | * 8/1991 | Riel et al. | 528/353 |
| 5,041,527 | * 8/1991 | Riel et al. | 528/353 |
| 5,041,528 | * 8/1991 | Riel et al. | 528/353 |
| 5,059,273 | 10/1991 | Boyce et al. | 156/307.4 |
| 5,061,784 | 10/1991 | Mueller et al. | 528/353 |
| 5,071,948 | 12/1991 | Khanna | 528/331 |
| 5,091,505 | 2/1992 | Serafini et al. | 528/353 |
| 5,124,199 | 6/1992 | O'Quinn et al. | 428/287 |
| 5,125,993 | 6/1992 | Principe | 156/155 |
| 5,132,395 | 7/1992 | Serafini et al. | 528/353 |
| 5,137,751 | 8/1992 | Burgess et al. | 427/123 |
| 5,149,760 | 9/1992 | Serafini et al. | 528/353 |
| 5,149,772 | 9/1992 | Serafini et al. | 528/353 |
| 5,168,011 | 12/1992 | Kovar et al. | 428/373 |
| 5,171,822 | 12/1992 | Pater | 528/188 |
| 5,175,241 | * 12/1992 | Darrow | 528/353 |
| 5,177,180 | 1/1993 | Griffin et al. | 528/353 |
| 5,230,937 | 7/1993 | Effenberger et al. | 428/113 |
| 5,244,857 | 9/1993 | Serafini et al. | 502/167 |
| 5,286,890 | 2/1994 | Dougherty | 556/425 |
| 5,296,183 | 3/1994 | Carbone et al. | 264/131 |
| 5,304,626 | * 4/1994 | Burgess et al. | 528/353 |
| 5,304,627 | 4/1994 | Connell et al. | 528/353 |
| 5,338,827 | 8/1994 | Serafini et al. | 528/353 |
| 5,360,671 | 11/1994 | Harris | 428/473.5 |
| 5,393,612 | 2/1995 | Matsuura et al. | 428/458 |
| 5,397,847 | 3/1995 | Harris et al. | 525/432 |
| 5,419,927 | 5/1995 | Dietrich | 427/98 |
| 5,432,001 | 7/1995 | Serafini et al. | 428/395 |
| 5,461,137 | 10/1995 | Serafini et al. | 528/353 |
| 5,461,138 | 10/1995 | Serafini et al. | 528/353 |
| 5,486,096 | 1/1996 | Hertel et al. | 416/224 |
| 5,543,493 | 8/1996 | Park et al. | 528/353 |
| 5,716,677 | 2/1998 | Mazany et al. | 427/393.5 |

FOREIGN PATENT DOCUMENTS

| | | |
|---|---|---|
| 0 317 216 | 5/1989 | (EP) . |
| 0 349 010 A1 | 1/1990 | (EP) . |
| 0 443 352 A2 | 8/1991 | (EP) . |
| 0 837 498 A1 | 1/1997 | (EP) . |
| 93-06151 | 4/1993 | (WO) . |

OTHER PUBLICATIONS

Serafini, Tito T., "High–Temperatture Resins", Handbook of Composites, Lubin, George, ed. Van Nostrand Reinhold Company, Inc.: New York, NY, 1982. pp. 89–114.

N. D. Hoyle and N. J. Stewart, "*Development of a New Lox Toxicity PMR–Type Polymide for Advanced Composite Applications*", 22nd International SAMPE Technical Conference, Nov. 6–8, 1990.

PCT International Search Report, 4 pages, mailed to Applicant May 3, 1999.

* cited by examiner

*Primary Examiner*—P. Hampton-Hightower
(74) *Attorney, Agent, or Firm*—Wood, Herron & Evans, L.L.P.

(57) ABSTRACT

The present invention is directed to polyimide systems which simultaneously offer low toxicity, a high glass transition temperature, excellent thermal oxidative stability, and desirable processing characteristics. These various polyimide systems include mixtures of monomeric reactants, polyimide-precursor reaction products, polyimides, and polyimide-containing articles. In one aspect of the invention, the mixture of monomeric reactants includes at least one dia-nhydride or a derivative thereof, and at least one diamine. The diamine may be 4,4'-[1,4-phenylene-bis(1-methylethylidene)]bisaniline, 4,4'-[1,3-phenylene-bis(1-methylethylidene)]bisaniline, and/or a derivative thereof. The diamine also may include a phenylenediamine, 2,2-bis[4-(4-aminophenoxyl)phenyl]propane, 4,4'(1,4-phenylene-bismethylene)bisaniline, and/or a derivative thereof. In addition, the mixture may include a reactive end-capping agent and/or a non-reactive end-capping agent. Also, if desired, the mixture of monomeric reactants may be a dry mix or a solution. The invention also is directed to articles formed from mixtures of monomeric reactants, articles formed from polyimide-precursor reaction products, and articles formed from polyimides themselves. Non-limiting examples include a powder, a neat resin, a coating, a film, a membrane, a foam, an adhesive, a fiber, a composite, a laminate, a prepreg, a part, and a bushing.

57 Claims, 2 Drawing Sheets

LOW-TOXICITY, HIGH-TEMPERATURE POLYIMIDES

CROSS-REFERENCE TO RELATED APPLICATIONS

This application claims the benefit of the filing date of Provisional U.S. Patent Application No. 60/071,599 entitled "Safe Polyimides for Manufacturing of High Temperature Components", which was filed on Jan. 16, 1998.

STATEMENT REGARDING FEDERALLY-SPONSORED RESEARCH

This invention was made with Government support under: Phase I SBIR Contract No. F33615-97-C-5018 awarded by the United States Air Force; Phase I SBIR Contract No. NAS-3-97085 awarded by the National Aeronautic and Space Administration; and Phase II SBIR Contract No. NAS-3-98024 also awarded by the National Aeronautic and Space Administration. The Government has certain rights in this invention.

BACKGROUND OF THE INVENTION

1. Field of the Invention

This invention relates to polyimides and, more particularly, to low-toxicity, high-temperature polyimides.

2. Description of the Related Art

The cost and weight of aerospace structures can be significantly reduced by the application of high-performance polymeric composites. By replacing metallic components with composite materials, significant weight and cost savings between 25 and 30 percent can be realized. The advent of high modulus fibers and thermally stable polymers made it possible for the introduction of composites into 316° C. (600° F.) temperature regimes. To this end, researchers at NASA Lewis Research Center developed a high-temperature addition polyimnide called PMR-15, which, over several decades, became the high-temperature matrix resin "work horse" for the aerospace industry.

For composite applications in the range of 250° C. to 325° C. the resin system of choice generally has been the PMR-15 polyimide (polymerization of Monomeric Reactants, 1500 molecular weight). The reactant monomers for PMR-15 consist of the monomethyl ester of 5-norbornene 2,3-dicarboxylic acid (nadic ester, NE), the dimethyl ester of 3,3',4,4'-benzophenonetetracarboxylic acid (BTDE), and 4,4'-methylenedianiline (MDA).

For PMR-type solutions, the number of moles of each monomer can be determined by the following ratio: 2:n:n+1, where 2 represents the moles of endcap, n equals the moles of the dialkyl ester of the aromatic tetracarboxylic acid, and n+1 quantifies the moles of the diarine. For PMR-15, this molar ratio becomes 2 NE: n=2.087 BTDE: n+1=3.087 MDA, which corresponds to a formulated molecular weight of 1500 for the imidized pre-polymer. At this molecular weight, a balance between thermo-mechanical properties and processing characteristics can be achieved.

In the reaction sequence of PMR-15, heating the monomers promotes reaction which forms the linear poly(amic acid) pre-polymer. Further heating converts the amic acid groups into the stable heterocyclic imide rings. Both reactions are considered "condensation" type since methanol and water are released as by-products. In actuality, there are many competing reactions that can occur during the imidization of PMR-15. These reactions are complex and lead to prepolymers that contain a variety of chemical functionality such as imide, amide, ester, and anhydride.

PMR-15 contains 4,4'-methylenedianiline (MDA), a known animal carcinogen, a suspected human carcinogen, and a known kidney and liver toxin. When quantities of PMR-15 prepreg are being manufactured, or when this material is being pr oduced into composite structures, exposure to MDA becomes a serious health hazard.

Thus it has become necessary for the Occupational Safety and Health Administration (OSHA) to issue and enforce very strict regulations regarding worker exposure to MDA. In fact, the permissible (human inhalation) exposure limit (PEL) defined by OSHA has been set at 10 parts/billion per eight hour shift. In most manufacturing facilities, this means dedicated work space in which all personnel must wear disposable booties, coveralls, dust masks, and gloves; and all personnel leaving the facility are required to shower.

Disposal of waste materials resulting from the manufacture of PMR-15 composite components is also a significant problem. Utmost care must be taken in handling uncured PMR-15 waste since it contains substantial quantities of unreacted MDA. Typically, 20–30% of the prepreg material issued to the manufacturing process is discarded.

In addition, waste material is generated during the manufacturing process that is contaminated by small quantities of PMR-15 resin: prepreg backing material, roll cores, kit bags, autoclave debulking materials and other process materials. Personal safety items such as shop coats, gloves, booties, and dust masks add to the disposal problem. Currently these materials are commonly disposed of together either through carefully controlled incineration or by being packed in a drum and shipped to a special hazardous material landfill. These methods of disposal are costly, and the material in the landfill remains indefinitely the responsibility of the generator.

There have been other attempts to circumvent the problems caused by the toxicity of MDA. These range from imidizing the PMR-15, so that the MDA is fully reacted before the product is sold to the composite manufacturer and thus harmless, to changing the chemical composition of the PMR-15 formulation. In fact, most ofthe investigations to date have been motivated by scientists measuring the effects of chemical composition on polymer properties, rather than by considerations of safety.

One example is NASA Langley's LARC-160 which is similar to PMR-15 with the exception that the MDA is replaced with a commercial diamine mixture (Jeffamine). This is said to improve the flow, tack, and drape, but at the expense of glass transition temperature and thermal oxidative stability. Cycom X3009 contains excessive amounts of the so-called bis-nadimnide, the condensation product of MDA and two nadic esters. This makes the material difficult to process and causes excessive micro-cracking on thermal cycling of the composites made from this product.

CPI 2320 from SP Systems, Inc., is based on RP46, and is described as an MDA-free PMR polyimide that is both safe and cost-effective as a replacement for PMR-15. However, the thermal stability of CPI 2320 at 316° C. and 1.03 Mpa air pressure is almost an order of magnitude poorer than that of PMR-15. SP Systems compared the stability of RP46 on T650-35 graphite fiber against PMR-15 on G30-500 graphite fiber and found similar results with poor thermal stability. In addition, subsequent toxicity testing completed by NASA-Lewis Research Center has suggested that the diamine in RP46 is also a potential carcinogen.

Many diamines lacking benzylic hydrogen do not make a stable PMR resin. The only (non-fluorinated) resins made with the usual benzophenonetetracarboxylic dimethyl ester that are comparable to PMR-15 in stability have been made with 1,1-bis(4-aminophenyl)-1-phenyl ethane. However, this diamine is an α-substituted MDA, and therefore can be expected to be relatively toxic and mutagenic. Most diamines chemically related to MDA (as well as MDA itself) give positive Ames tests for mutagenicity and the degree of mutagenicity can vary by orders of magnitude between diamines.

Currently, researchers at NASA-Lewis have developed a polyimide resin called AMB-21 which replaces MDA with 2,2-bis( 4-[4-aminophenoxyl]phenyl)propane (BAPP), a non-toxic, non-carcinogenic monomer. AMB-21 has further benefit in that it may be formed into composite components by using resin transfer molding (RTM). RTM fabrication techniques fall into the category of "low-cost" composite processing, since RTM can cut the manufacturing costs by up to 50%. Unfortunately, AMB-21 has a glass transition temperature (after post-cure) of only 285° C., which also falls short of the PMR-15 goal to achieve a 316° C. composite use-temperature.

SUMMARY OF THE INVENTION

The present invention overcomes the above-mentioned drawbacks by providing polyimide systems which simultaneously offer low toxicity, a high glass transition temperature, excellent thermal oxidative stability, and desirable processing characteristics. These various polyimide systems include mixtures of monomeric reactants, polyimide-precursor reaction products, polyimides, and polyimide-containing articles.

In one aspect of the invention, the mixture of monomeric reactants includes at least one dianhydride or a derivative thereof, and at least one diamine. The diamnine may be 4,4'-[1,4-phenylene-bis(1-methylethylidene)]bisaniline, 4,4'-[1,3-phenylene-bis(1-methylethylidene)]bisaniline, and/or a derivative thereof. The diamine also may include a phenylenediamine, 2,2-bis[4-(4-aminophenoxyl)phenyl] propane, 4,4'(1,4-phenylene-bismethylene)bisaniline, and/or a derivative thereof.

If desired, the dianhydride may be 3,4,3',4'-biphenyltetracarboxylic dianhydride, 3,4,3',4'-benzophenonetetracarboxylic dianhydride, 2,2-bis(3',4'-dicarboxyphenyl)hexafluoropropane dianhydride, pyromellitic dianhydride, and/or 4,4'-oxydiphthalic anhydride. In addition, the mixture may include a reactive end-capping agent and/or a non-reactive end-capping agent. Also, if desired, the mixture of monomeric reactants may be a dry mix or a solution.

In another aspect, the mixture of monomeric reactants includes a dianhydride or a derivative thereof, 2,2-bis[4-(4-aminophenoxyl)phenyl]propane or a derivative thereof; and 4,4'(1,4-phenylene-bismethylene)bisaniline or a derivative thereof. Alternatively, the mixture may include a dianhydride or a derivative thereof, 2,2-bis[4-(4-aminophenoxyl) phenyl]propane or a derivative thereof, and a phenylenediamine. A further version of the mix of monomeric reactants includes a dianhydride or a derivative thereof, 4,4'(1,4-phenylene-bismethylene) bisaniline or a derivative thereof, and a phenylenediamine.

A further aspect of the invention is directed to: a polyimide-precursor reaction product, with the reaction product including a polyamic acid or a derivative thereof, formed by a reaction of a mixture of monomeric reactants; a polyimide formed by a reaction of the polyamic acid or the derivative thereof; and a polyimide wherein the polyimide has at least a first end and a second end, with at least one of the first and second ends having an end cap formed from an end-capping agent.

The invention also is directed to articles formed from mixtures of monomeric reactants, articles formed from polyimide-precursor reaction products, and articles formed from polyimides themselves. An article may be any object so formed, as will be understood by those of ordinary skill in the art, with a few, non-limiting examples including a powder, a neat resin, a coating, a film, a membrane, a foam, an adhesive, a fiber, a composite, a laminate, a prepreg, a part, and a bushing.

Another aspect of the invention involves a method of making a mixture of monomeric reactants. The method includes mixing at least one dianhydride or a derivative thereof, at least one diamine or a derivative thereof, a solvent including an alcohol, and a co-solvent including n-methylpyrrolidinone. In further detail, the diamine includes at least 4,4'-[1,4-phenylene-bis(1-methylethylidene)]bisaniline, 2,2-bis[4-(4-aminophenoxyl) phenyl]propane and/or 4,4'(1,4-phenylene-bismethylene) bisaniline, and the co-solvent is present in an amount sufficient to dissolve the diamine or the derivative thereof.

The invention further encompasses a method of enhancing the glass transition temperature ($T_g$) of a polyimide, the polyimide being formed from a mixture of monomeric reactants including at least one dianhydride or a derivative thereof and at least one diamine or a derivative thereof. The monomeric reactants have a total amount of diamine, and the method includes increasing the molar ratio of a phenylenediamine to the total amount of diamine, thereby enhancing the glass transition temperature ($T_g$) of the polyimide.

The present invention offers several benefits and advantages as noted briefly above, including, for example, low toxicity, a high glass transition temperature, excellent thermal oxidative stability, and desirable processing characteristics. In further detail, virtually all of the polyimide systems of the invention have a thermal glass transition temperature ($T_g$) of at least 245 degrees Celsius, with many of the systems having a thermal glass transition temperature ($T_g$) of at least 316 degrees Celsius. Moreover, numerous systems show excellent thermal oxidative stability (TOS), losing less than ten percent by weight under conditions of 316 degrees Celsius and 125 pounds per square inch absolute (psia) air pressure for a period of 125 hours, while several other systems lose less than three percent by weight under these same, severe testing conditions. These and other benefits and advantages will become readily apparent to those of ordinary skill in the art upon a review of the Drawings and a reading the Detailed Description presented below.

DETAILED DESCRIPTION OF SEVERAL EMBODIMENTS OF THE INVENTION

Figure 1:
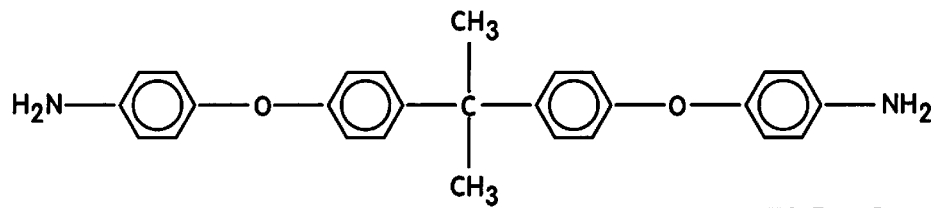
FIG. 1 is 2,2-bis[4-(4-aminophenoxyl)phenyl]propane.

The entire disclosure of Provisional U.S. Patent Application No. 60/071,599 entitled "Safe Polyimides for Manufacturing of High Temperature Component", filed on Jan. 16, 1998, is hereby incorporated in its entirety by reference.

As noted briefly above, the present invention is directed to polyimide systems which simultaneously offer low toxicity, a high glass transition temperature, excellent thermal oxidative stability, and desirable processing characteristics. These various polyimide systems include mixtures of monomeric reactants, polyimide-precursor reaction products, polyimides, and polyimide-containing articles.

The mixtures of monomeric reactants include at least one dianhydride or a derivative thereof, and at least one diamine or a derivative thereof, while the polyimide-precursor reaction products include a polyamic acid or a derivative thereof, formed by a reaction of the monomeric reactants. As will be appreciated by those of ordinary skill in the art, any suitable dianhydride, diamine, or derivative thereof may be used in forming the polyimide systems of the present invention, in addition to those explicitly named herein. By way of example, numerous dianhydrides and diamines are disclosed in Harris et al. U.S. Pat. No. 5,397,847, Griffin et al. U.S. Pat. No. 5,177,180, Mueller et al. U.S. Pat. No. 5,061,784, and Vora U.S. Pat. No. 4,978,737, the entire disclosure of each of these patents being hereby incorporated in its entirety by reference.

As used herein, the term "derivative" includes any isomer of the dianhydride, diamine, or polyamic acid to which the term refers. In addition, with respect to dianhydrides, "derivative" includes a tetracarboxylic acid, a tetraester, a monoacid/triester, a triacid/monoester, and a diacid/diester.

The polyimide systems of the invention may be created in any of a number of different physical forms, as will be appreciated by one of ordinary skill. The monomeric reactant mixtures typically are in solution, in which case suitable solvents and co-solvents may be used, as appropriate. For example, any alcohol or combination of alcohols may be used, with methanol being particularly advantageous. Alternatively, as understood by persons of ordinary skill, high-boiling, aprotic solvents are beneficial when making powders. Non-limiting examples of such solvents include NMP, DMSO, m-cresol, pyridine, THF, DMF, xylene, and diglyme, with NMP being especially beneficial.

Any of the polyimide systems of the invention may incorporate one or more end-capping agents. As will be understood by one of ordinary skill, if cross-linking is desired, then a reactive agent may be used. Alternatively, if cross-linking is not desired, then a non-reactive agent may be used. Non-limiting examples of reactive agents include nadic ester and PEPA, while aniline and phthalic anhydride (and its acids/esters) are non-limiting examples of a non-reactive end-capping agent.

The examples presented below assist in illustrating several embodiments of the invention. However, it should be noted that the scope of the invention is not limited to these examples.

WORKING EXAMPLES

The Diamines Used in the Working Examples

Figure 2:
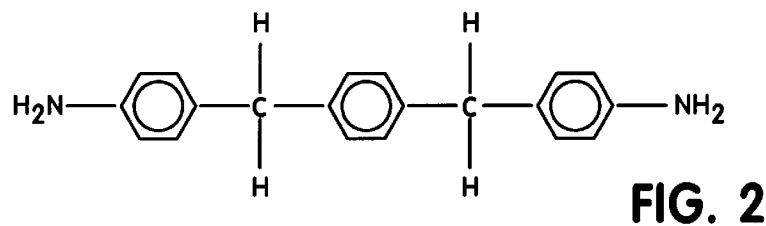
FIG. 2 is 4,4'(1,4-phenylene-bismethylene)bisaniline.
Figure 3:
FIG. 3 is para-phenylenediarnine.
Figure 4:
FIG. 4 is meta-phenylenediamine.
Figure 5:
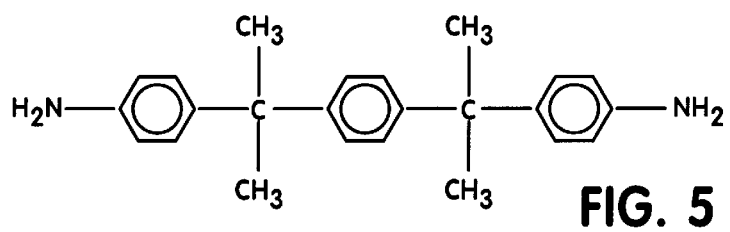
FIG. 5 is 4,4'-[1,4-phenylene-bis(1-methylethylidene)] bisaniline.
Figure 6:
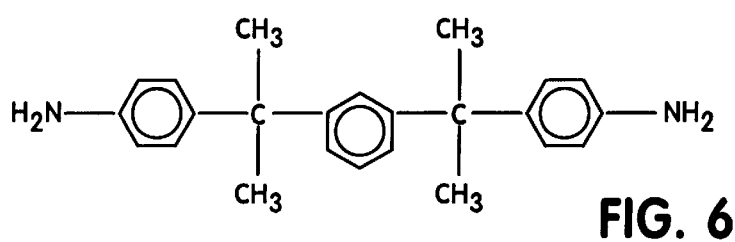
FIG. 6 is 4,4'-[1,3-phenylene-bis(1-methylethylidene)] bisaniline.

The chemical name for BAPP is 2,2-bis(4-[4-aminophenoxyl]phenyl) propane and the chemical structure can be found in FIG. 1. BAAP is a commercial monomer and can be obtained from the Chriskev Company located in Leawood, Kans. Ames tests, DNA repair tests, and Chromosomal Aberration tests have found BAPP to be non-mutagenic. The chemical name for BAX is 4,4'(1,4,-phenylenebismethylene)bisaniline and the chemical structure can be found in FIG. 2. BAX is currently an experimental diamnine that can be custom synthesized at either St. Norbert College (Depere, Wis.) or at Akron University (Akron, Ohio). BAX is a non-commercial, experimental diamine that should increase polymer performance and yet still have low-toxicity. The chemical name for PPDA is para-phenylenediamine (or 1,4-phenylenediamine) and the chemical structure can be found in FIG. 3. PPDA is also a commercial chemical that can be purchased from DuPont Company located in Wilmington, Del. Paraphenylenediamine is a commercial diamine that increases polymer performance and demonstrates no carcinogenic activity in animals. The chemical name for MPDA is meta-phenylenediamine (or 1,3-phenylenediarine), and the structure is shown in FIG. 4. The chemical name or formula for BIS-P is 4,4'-(1,4-phenylene-bis(1-methyl ethylidene))bisaniline, and the chemical structure can be found in FIG. 4. Bisaniline-P is an aromatic diamine which produced a negative Ames Mutagenicity Assay. The chemical name or formula for BIS-M is 4,4'-(1,3-phenylene-bis(1-methyl ethylidene))bisaniline, and the chemical structure can be found in FIG. 6. Bisaniline-M is an aromatic diamine which also produced a negative Ames Mutagencity Assay. Both BIS-P and BIS-M are commercial chemicals that can be obtained from Mitsui Chemicals America, Inc., located in Newark, N.J.

Except for BAX, the advantages of these diamines include low cost (<$50/pound) as well as low toxicity. In fact, the acute oral LD50 values for Bisaniline-P and Bisaniline-M are more than ten times higher than that of MDA, which translates into greater worker safety during polymer synthesis and composite processing. (ADD IN FNOTE 19) Table I compares the toxicological data of MDA vs. That of Bisaninine-P and Bisaniline-M. In addition, the Ames Mutagenicity Assays for Bisaniline-P and Bisaniline-M were negative with and without metabolic activation. (ID)

TABLE I

Toxicological Data for MDA vs. Bisaniline-P and Bisaniline-M
Bisaniline-P and Bisaniline-M are considered to be low-toxicity
diamines based on acute oral LD50 data.

|  | MDA | BIS-P | BIS-M |
| --- | --- | --- | --- |
| Acute Oral LD50 (mg/kg rat) | 347 | >5,000 | 6,240 |
| Acute Dermal LD50 (mg/kg rat) | 200 | >2,000 | Non-irritating to rabbit skin |

The Dianhydrides Used in the Working Examples

Figure 7:
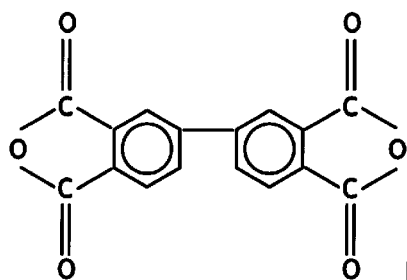
FIG. 7 is 3,4,3',4'-biphenyltetracarboxylic dianhydride.
Figure 8:
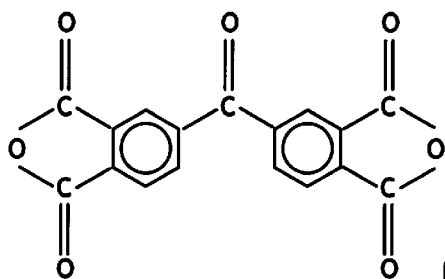
FIG. 8 is 3,4,3',4'-benzophenonetetracarboxylic dianhydride.

In order to provide a short description for several of the dianhydrides that were utilized during polyimide synthesis, the chemical name for BPDA is 3,4,3',4'-biphenyltetracarboxylic dianhydride and the chemical structure can be found in FIG. 7. BPDA is a moderately priced ($116/lb) commercial monomer and can be obtained from the Chriskev Company located in Leawood, Kans. BPDA is a moderately priced dianhydride with good thermal stability and average processing characteristics. The chemical name for BTDA is 3,4,3',4'-benzophenonetetracarboxylic dianhydride and the chemical structuire can be found in FIG. 8. BTDA is an inexpensive ($35/lb) dianhydride that represents a constituent of the current PMR-15 formulation. BTDA can also be procured from the Chriskev Company.

Figure 9:
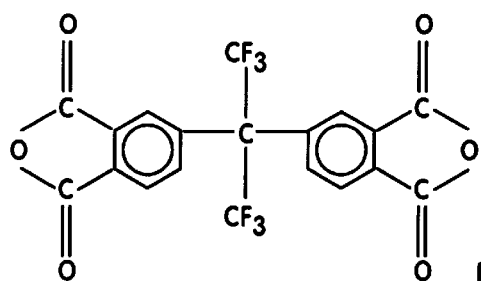
FIG. 9 is 2,2-bis(3',4'-dicarboxyphenyl) hexafluoropropane dianhydride.
Figure 10:
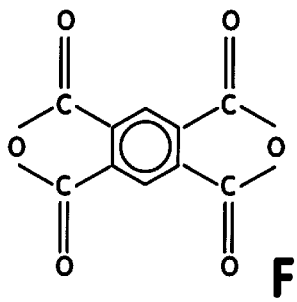
FIG. 10 is pyromellitic dianhydride.
Figure 11:
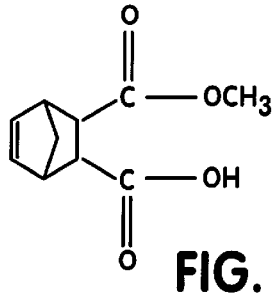
FIG. 11 is the monomethyl ester of 5-borbornene-2,3-dicarboxylic acid.

The chemical name for 6FDA is 2,2-bis(3',4'-dicarboxyphenyl)hexafluoropropane dianhydride and the chemical structure can be found in FIG. 9. 6FDA is an expensive dianhydride ($400/lb) that can be purchased in commercial in commercial quantities from Clariant Corporation located in Charlotte, N.C. 6FDA offers superior thermal performance and processing. The chemical name or formula for PMDA is pyromellitic dianhydride, and the chemical structure can be found in FIG. 10. Priced around $35/lb, PMDA is a commercial dianhydride that can be purchased through the Chriskev company. PMDA is a "rigid" dianhydride that increases polyuimide Tg at the expense of processing.

The Crosslinking Agent and Solvents Used in the Working Examples

The crosslinking monomers NE (the monomethyl ester of 5-norbornene 2,3-dicarboxylic acid) and/or NA (5-norbornene 2,3-dicarboxylicacid anhydride) were used as crosslinking agents. The NE was purchased through Chriskev, and the NA was supplied by Jarchem Industries, Inc., located in Newark, N.J. All solvents were obtained through the Tedia Company located in Farifield, Ohio.

Polyimide Systems Made by Combining BAPP with PDA

Co-polymers were made by combining the BAPP diamine with isomers of phenylenediamine (PDA) in combination with the BTDA dianhydride or by partial replacement of the BTDA dianhydride with biphenyl dianhydride (BPDA).

Both uni-tape and 8-harness satin graphite reinforced laminates were fabricated in an autoclave and tested for Tg (by Thermal Mechnaical Analysis, TMA) and TOS (Table II). Several of the polyimide resin solutions were also successfully resin-transfer molded into 2"-diameter, braided, composite tubes with low void contents.

The chemical "backbone" of the BAPP diamine was considered to be high in molecular weight and fairly "flexible." In order to increase Tg, BAPP was partially replaced with more rigid diamines at several molar levels. By utilizing a low-molecular-weight, rigid diamine in the polymer formulation, the calculated molecular weight of the polyimide oligomer was reduced from the original 2100. Four new formulations were synthesized by combining the BAPP diamine with isomers of phenylenediamine (PDA) at the following levels: 10, 20, 30, and 40 mole % (AMB-20XL, AMB-19XL, AMB-18XL, and AMB-17XL, respectively). In addition, biphenyl dianhydride (BPDA) was studied as a Tg and TOS enhancer. One formulation was synthesized by replacing 50 mole % of the BTDA with BPDA (AMB-17XLB). A total of five formulations resulted, and the TOS (at 316° C., 1024 hrs.) and Tg data can be found in Table II.

From the data in Table II, the AMB-18XL formulation was considered to have the best overall thermal performance. Therefore, it became apparent from the data that PPDA and mixtures of PPDA/MPDA could be used to enhance the Tg and TOS of these polymeric solutions.

TABLE II

Glass Transition and TOS Data

| RESIN FORMULATION | FORMULA DESCRIPTION (BAPP SUBST) | Tg (° C.) | WEIGHT LOSS (316° C., 1024 HRS., 1 ATM) |
|---|---|---|---|
| AMB-20XL 10% | 10% PPDA | 314 | 8.5 |
| AMB-19XL | 20% PPDA | 311 | 8.0 |
| AMB-18XL | 25% PPDA/ 5% MPDA | 325 | 7.0 |
| AMB-17XL | 30% PPDA/ 10% MPDA | 355 | 8.3 |
| AMB-17XLB | 50/50% BTDA/BPDA & 30% PPDA/ 10% MPDA/ | 328 | 8.4 |

Polyimide Systems Made with BIS-P, BAPP, and/or BAX

Ten formulations were produced at low molecular weight (n=2, or n=3). In all formulations, the dimethyl ester of 3,3',4,4'-benzophenonetetracarboxylic dianhydride (BTDA) was used as the reactive monomer, and the monomethyl ester of 5-norbornene 2,3-dicarboxylic anhydride (NA) was used as the crosslinker. All resin systems were synthesized using the synthesis methods described in detail below.

1) 100% BAX at n=2 (BAX-17, MW-1 700) and n=3 (BAX-23, MW-2300)
2) 50% BIS-P/50% BAX at n–2 (BIAX-18) and n=3 (BIAX-24)
3) 100% BIS-P at n=2 (BIP-19) and n=3 (BIP-25)
4) 50% BAX/50% BAPP at n=2 (AXAP-19) and n=3 (AXAP-25)
5) 50% BIS-P/50% BAPP at n=2 (BIAP-20) and n=3 (BIAP-26)

N-methylpyrrilidinone (NMP) was used as a cosolvent, in addition to methanol and acetone, in order to maintain the solubility of the fairly large molecular weight diamines (56% methanol30% NMP/14% acetone by weight). These solutions have been stable in the freezer (without precipitation) for over twelve months.

These resin systems were compression molded into braided composite bushings and autoclaved into carbon fiber reinforced laminates. A typical autoclave cure cycle for producing composite laminates is as follows: 1.7° C./min up to 163° C. and hold for one hour with 15 inches of vacuum, 1.7° C./min up to 218° C. and hold for one our using full vacuum, 2.8° C./min up to 232° C. where 200 psi pressure is applied, and then increase temperatuer up to 316° C. with a final two hour hold before cooling to room temperature. A similar cycle, without vacuum, can be used for compression molding. A subsequent ten-hour post-cure at 316° C. was conducted in an air re-circulating oven. The glass transition temperature (Tg) was then measured by TMA followed by thermal oxidative stability testing at New Hampshire Ball Bearing and Cincinnati Test Laboratories. The results are summarized in Table III.

The Tg range for all ten resin systems (before post-cure) was 247° C. to 291° C. Since the lower molecular weight (n=2) resins were formulated with larger amounts of the nadic crosslinker, these systems were expected to produce higher Tg values than their comparable n=3 counterparts. This was not always the case as shown by the BAX, BIP, and BIAP resin systems. The AXAP and BAX candidates did conform to this generalization.

Once the "as-molded" Tg data was obtained, the post-cure cycle was designed by using the lowest Tg after molding because all of the bushing were post-cured in a single batch.

Since the low Tg was determined to be 476° F. (247° C.), the first 2 hour post-cure hold was started at 25° below that temperatuer, or 450° F. (232° C.). The post-cure continued with 2 hour holds every 30° up to 600° F. (316° C.) where a 10 hour final hold was employed. The Tg data after post-cure can also be found in Table III.

TABLE III

Thermal Oxidative Stability and Tg Data

| RESIN SYSTEM | Tg AFTER POST CURE (° C.) | Tg AFTER POST CURE (° C.) | NHBB BUSHING WEIGHT LOSS (%) | CTL BUSHING WEIGHT LOSS (%) | CTL LAMINATE WEIGHT LOSS (%) |
|---|---|---|---|---|---|
| BAX-23 | 262 | 364 | 18.4 | 23.3 | 4.9 |
| BAX-17 | 260 | 347 | 18.8 | 24.0 | 3.8 |
| BAX-24 | 262 | 324 | 19.6 | 23.4 | 6.0 |
| BIP-25 | 291 | 311 | 20.1 | 24.4 | 1.3 |
| BIAX | 280 | ** | 20.8 | 25.6 | 5.5 |
| BIP-19 | 279 | 331 | 21.9 | 27.8 | 1.3 |
| BIAP | 247 | N/D | 23.1 | 27.9 | 5.8 |
| AXAP | 268 | 321 | 24.0 | 28.1 | 4.1 |
| BIAP-26 | 255 | N/D | 24.6 | 30.0 | 6.2 |
| AXAP-25 | 250 | 332 | 24.6 | 27.3 | 6.4 |

**Bushing expanded up to 30% after post-cure; could not detect a transition.
N/D - Could not detect a visible transition up to 450° C.
NHBB - TOS test consisted of 100 hours of thermal exposure at 600° F. (316° C.) under 70 psia air pressure. Each weight loss represents an average of two bushings.
CTL - TOS test consisted of 100 hours of thermal exposure at 600° F. (316° C.) under 125 psia air pressure. Each weight loss represents an average of two bushings.

The results show that at least six of the experimental resin candidates exhibited +316° C. Tg values.

In addition to Tg determination, the variable stator vane bushing candidates were subjected to thermal oxidative stability (TOS) testing at both NHBB and Cincinnati Testing Laboratories (CTL). All of the laminates were subjected to the CTL "bomb" test with the bushing samples even though only two (BIP-19 and BIP-25) of the ten experimental resins produced low-void panels (i.e., produced good c-scans at NASA LeRC) during autoclave molding. At least two post-cured bushing samples and one laminate from each resin system were supplied for the "bomb" test, which utilizes high-pressure air to accelerate oxidation. This TOS test was first designed by GE Aircraft Engines (GEAE) in an attempt to simulate the harsh conditions that can be found in the different areas of a jet engine.

At NHBB, this TOS test consisted of 100 hours of thermal exposure at 600° F. (316° C.) under 70 psia air pressure. At CTL, the test consisted of 100 hours of thermal exposure at 600° F. (316° C.) under 125 psia air pressure. Both facilities used five volume changes of air in the sample chamber each hour of exposure. The bushing and laminate weight loss data for the ten candidate resin systems is shown in Table III.

The TOS data outlined in Table III show that the weight loss data for the laminates were more fovorable than the data for the bushings. However, it should be noted that NHBB utilized a cure cycle for the bushing samples that had been previously "optimized" for production hardware and not these resin systems. In addition, the consolidation pressure for the experimental bushings was applied extremely late in the manufacturing process [e.g., +540° F. (282° C.)], so there was a good chance that cyclopentadiene gas evolved in appreciable quantities, thereby limiting the NE crosslinking reaction. This scenario would be especially true for BIP-19 where the final consolidation pressure was applied as late as 600° F. (316° C.). The laminate's consolidation pressure, on the other hand, was applied early in the cure cycle of cyclopentadiene evolution.

A possible explanation for the thermal performance of the experimental variable stator vane bushings may be a very open, or porous, braided carbon fiber structure, whereas the panels utilized a tight 8-harness cloth as the reinforcement. The affects on weight loss could be dramatic.

Even with the differences in weight loss between the bushings and laminates, several general conclusions may be drawn concerning the experimental resin systems. First of all, the overall ranking or order of the weight-loss data from low to high remained consistent from one facility to the other. In addition, the bushings with the highest weight loss were fabricated with copolyimides containing the "BAPP" diamine (e.g., BIAP-20, BIAP-26, AXAP-19, and AXAP-25). Those systems formulated with GAX (BAX-17 and -23), BIS-P (BIP-19 and -25), or both (BIAX-18 and -24) had lower weight loss when compared to the "BAPP" materials.

This data set provided the exciting discovery that both polyimides formulated with the BIS-P diamine (BIP-19 and BIP-25) achieved excellent thermal oxidative stability results (only 1.3% weight loss). This was a major accomplishment in developing non-toxic, high-temperature polyimide resin systems.

In summary, the results obtained on variable stator vane bushings and flat composite panels indicate that a "family" of high-temperature polyimides have been developed which have both a=31 6° C. glass transition temperature and excellent thermal stability. The laminate weight loss datga also reiterates that BIS-P and BIS-P copolymers have great potential as commercially viable high-temperature composite systems.

Polyimide Systems Utilizing BIS-P and BIS-M

A matrix of polyirnide copolymers was synthesized by using Bisaniline-P, Bisaniline-M, and paraphenylenediamine (PPDA). Partial molar substitutions of PPDA (up to 50 mole percent) were used in order to increase glass transition temperatuer and/or thermal oxidative stability. Pre-polymer molecular weight was also adjusted to favorably impact processing parameters as well as the final Tg. Each copolymer was formulated at a molar ratio of 2 NE: 2 BTDE: 3 Diamine. All of the resin systems were synthesized using standard techniques known in the industry. In some of the BIS-P formulations, n-methylpyrrilidinone (NMP) was used as a solvent in addition to methanol. This was done in order to maintain the solubility of the fairly large molecular-weight BIS-P diamine. NMP was not needed in the BIS-M formulations since this diamine was readily soluble in methanol. A detailed description of the low-toxicity polyimnide systems that were developed is shown below in Table IV.

TABLE IV

Detailed Description of Non-Toxic Polyimide Systems

| Resin System | Formulated Molecular Weight | Diamine Molar Ratios | |
|---|---|---|---|
| | | BIS-P/PPDA | BIS-M/PPDA |
| BIP-19 | 1898 | 100/0 | — |
| BIP-17 | 1756 | 80/20 | — |
| BIP-16 | 1685 | 70/30 | — |
| BIP-15.5 | 1614 | 60/40 | — |
| BIP-15 | 1543 | 50/50 | — |
| BIM-19 | 1898 | — | 100/0 |
| BIM-17 | 1756 | — | 80/20 |

TABLE IV-continued

Detailed Description of Non-Toxic Polyimide Systems

| Resin System | Formulated Molecular Weight | Diamine Molar Ratios BIS-P/PPDA | BIS-M/PPDA |
|---|---|---|---|
| BIM-16 | 1685 | — | 70/30 |
| BIM-15.5 | 1614 | — | 60/40 |
| BIM-15 | 1543 | — | 50/50 |

These resin systems were resin-transfer molded into braided, composite tubes and autoclaved into carbon-fiber-reinforced laminates. Tube and laminate Tg's were measured at GE and NASA-LeRC, respectively. TOS testing of the tubes and laminates was completed at CTL. In addition, laminate samples were compression tested at CTL. The results are summarized in Table V.

TABLE V

Thermal Oxidative Stability and Tg Data

| Resin System | Average Laminate Tg After Post-Cure (° C.) | Tube Tg After Post-Cure (° C.) | Laminate Weight Loss (%) | Tube Weight Loss (%) | Compression Strength after TOS* (ksi) |
|---|---|---|---|---|---|
| BIP-19 | 245 | — | 3.1 | 5.4 | 28.0 |
| BIP-17 | 262 | 323 | 2.6 | 6.9 | 44.1 |
| BIP-16 | 333 | 326 | 2.3 | 4.8 | 67.9 |
| BIP-15.5 | 343 | — | 4.8 | — | 33.1 |
| BIP-15 | 347 | — | 8.6 | 6.6 | 28.8 |
| BIM-19 | 256 | — | 2.1 | — | 22.9 |
| BIM-17 | 279 | — | 2.0 | — | 43.5 |
| BIM-16 | 295 | 280 | 2.0 | 4.0 | 60.2 |
| BIM-15.5 | 317 | — | 2.4 | — | 55.9 |
| BIM-15 | 333 | — | 5.9 | 8.0 | 36.9 |

CTL-TOS test consisted of 125 hours of thermal exposure at 600° F. (316° C.) under 125 psia air pressure.
*Compression testing was completed at 288° C. after TOS exposure.

The Tg results in Table V conclusively show that paraphenylenediamine (PPDA) can be used as a Tg "enhancer" in polyiride formulations. In both the BIS-P and BIS-M containing copolyimides, the Tg increased as the molar percent substitution of PPDA increased. This further verified the results achieved in the BAPP/PPDA co-polymer work discussed above. This is due to the stiffening of the polymer chain with a highly aromatic monomer such as PPDA. Five of the formulations outlined in Table V have Tg's greater than 316° C., and two of the BIS-P formulations (BIP-15.5 and BIP-15) actually produced Tg's over 340° C.

The TOS test results were also extremely encouraging, since six out of the ten formulations produced into laminates had weight4oss values less than 3%. The composite tubes produced by the RTM process displayed somewhat higher weight-loss values than the laminates. This may have been due to non-optimized cure cycles which were used for the RTM process. Another possible explanation may be due to the actual fiber architecture of the tubular component. The RTM tubes contained a very open, or porous, braided, carbon-fiber structure, whereas, the panels utilized a tight, 8-harness cloth as the reinforcement. These subtle fiber differences may have a dramatic difference on the weight loss of the composite sample.

The compression data found in Table V is also encouraging. Three of the candidates (BIP-19, BIM-16 and BIM-15.5) had a compression-strength over 50 ksi. This is significant in light of the fact that the testing was performed at elevated temperature (288° C.) after the laminates had been TOS tested at 316° C. Four of the systems with lower compression-strength (BIP-19, BIP-17, BIM-19, and BIM-17) were tested above their Tg's. It is expected that these results would be improved if the testing was repeated at a temperature below the Tg's. In addition, the laminates used for the testing were all fabricated using a single autoclave run which was not optimized for the individual systems.

The results obtained on braided tubes and flat, composite panels indicate that a "family" of high-temperature polyimides have been developed which have both a high glass-transition-temperature (+316° C.) and excellent thermal stability at 316° C. The laminate weight loss data also reveal that both BIS-P and BIS-M formulations (with partial molar substitutions of PPDA) have great potential in low-toxicity, high-temperature, composite applications. Many other companies and government agencies have tried to achieve these results without success. We believe this is the first time that both the glass transition and thermal stability requirements have been simultaneously met with a cost-competitive, non-MDA resin system.

This technology can also be applied to other MDA-containing systems such as bismaleimides and epoxies. Since MDA-containing plastics are utilized in almost every industry, effective MDA substitutes allow a dramatic reduction in environmental health costs and disposal costs, thereby helping U.S. businesses to remain competitive in global markets. Many potential applications will arise, for example, in the automotive, chemical and aerospace industries.

Polyimide Powder Technology

This non-MDA technology can also be applied to thermoset (with NA crosslinking) or thermoplastic (without NA cross-linking) polyimide powders (or poly(amic acid) systems). Powders become especially important in adhesive, coating, injection molding, resin transfer molding, and compression molding applications. A variety of polyimide powders were synthesized with and without crosslinking, and these systems may be found in Table VI and Table VII. Most of these polyimide powders have been subjected to compression and RTM molding trials as well as testing for thermal properties.

Several of the polyimide powders described in Table VI were submitted for Thermal Gravimetric Analysis (TGA) testing along with a control 5250-4 bismaleimide (BMI). The preliminary TGA data have been summarized in Tables VIII and IX, according to the heat-rise rate used during the test procedure (5° C./min and 10° C./min, respectively). The TGA results show several trends.

TABLE VI

Formulation of Polyimide Oligomers With Crosslinker

| Nomenclature | n- | Fmw | Dianhydride | Diamine | Endcap | Solvent |
|---|---|---|---|---|---|---|
| BB-1 | 1 | 1239 | BPDA | BIS-P | NA | NMP |
| BB-2 | 2 | 1842 | BPDA | BIS-P | NA | NMP |
| BB-3 | 3 | 2445 | BPDA | BIS-P | NA | NMP |
| BPM-2 | 2 | 1133 | BPDA | 50% MPDA | NA | NMP |
| BPM-3 | 3 | 1499 | BPDA | 50% MPDA | NA | NMP |
| PB-2 | 2 | 1690 | PMDA | BIS-P | NA | NMP |
| PB-3 | 3 | 2217 | PMDA | BIS-P | NA | NMP |
| 6FB-1 | 1 | 1390 | 6FDA | BIS-P | NA | NMP |
| 6FB-2 | 2 | 2142 | 6FDA | BIS-P | NA | NMP |
| BTB-1 | 1 | 1267 | BTDA | BIS-P | NA | NMP |

TABLE VII

Formulation of Polyimide Oligomers Without Crosslinker

| Nomenclature | Dianhydride | Diamine | Solvent |
|---|---|---|---|
| MP-3L | PMDA/ | BIS-P | NMP |
| MP-4L | BPDA | BIS-P | NMP |
| MP-5 | PMDA | BIS-M | NMP |
| MP-6L | BPDA | BIS-M | NMP |
| MP-7 | BPDA | 50% BIS-P:50% p-PDA | NMP |
| MP-8 | BPDA | 50% Bis-M:50% p-PDA | NMP |

In Table VIII, the two polyimide samples (BPM-2 and BPM-3) have a total weight-loss of about 6.7% up to 300° C. By reviewing the actual TGA curves, this initial weight-loss occurs just after 200° C. Since the reaction solvent (NMP) boils at 202° C., it is suspected that the early weight-loss corresponds to residual NMP solvent left over after the oven-drying operation. These findings are also consistent with the initial weight-losses (up to 350° C.) that were measured for the polyimide powders listed in Table IX.

Also shown in Table VIII is the total weight-loss (%) measured at 400° C. The "control" 5250-4 BMI reveals a 36% weight-loss, while the worst-case polyimide oligomer powder (BPM-2) is only 17%. The results also suggest that n=3 (higher molecular weight) oligomers may have a slight TOS advantage over the n=2 versions. This could be a realistic trend since the nadic crosslink is considered by most to be the weak link. Higher molecular-weight oligomers may have an advantage with respect to TOS and toughness, but generally at the expense of processing and lower Tg.

TABLE VIII

Preliminary TGA of High-Temperature Polyimide Powders vs. 5250-4 BMI (Utilizing 5° C./min Heat Rise Rate in Air)

| RESIN TYPE | TOTAL WEIGHT LOSS (%) AT 300° C. | TOTAL WEIGHT LOSS (%) AT 400° C. | MAXIMUM PEAK IN DERIVATIVE CURVE (° C.) |
|---|---|---|---|
| 5250-4 BMI | 4.1 | 36 | 416** |
| BPM-2 | 6.7 | 17 | 468 |
| BPM-3 | 6.6 | 13 | 474 |

**Average value of two very large peaks. (One at 369.2° C. and the other at 463.1° C.)

Another indication of TOS can be found in the "maximum peak (° C.) in the TGA derivative curve." This peak represents the point at which the TGA weight-loss curve has reached its largest slope downward (the point of maximum weight-loss—i.e., the decomposition temperature). 5250-4 BMI actually has two very strong decomposition peaks that average to approximately 416° C. As shown in Table VIII, the polyimide samples are at least 50° C. above this average. Overall, it would appear that the two polyimide powders made with biphenyl dianhydride offer somewhat better thermal oxidative stability compared to the BMI.

Table IX summarizes the thermal stability of several different polyimide resins that used different dianhydrides but the same diamine (BIS-P). When the dianhydride was substituted from biphenyl dianhydride to pyromellitic dianhydride, the total weight-loss at 450° C. changed from 22–24% to 32%. Although PMDA has a cost advantage, it appears that BPDA has the thermal performance.

All of the polyimides listed in Table IX have decomposition temperatures in excess of 500° C., which exceeds that of the baseline BMI resin system. Once again, the initial weight-loss in Table IX that occurs between 200° C. and 350° C. is believed to be due to residual NMP solvent. (Note: Some NMP (1–2%) may be useful for promoting flow during RTM processing.)

Detailed synthesis procedures to prepare the oligomers found in Tables VI and VII have been provided in the invention examples. It should be noted that other end-groups that chemically crosslink the oligomers can be used in addition to NA. For example, crosslinking systems such as phenylethynylphthalicanhydride (PEPA) may offer a polymer with enhanced thermal stability over the NA version; the major drawback with PEPA is the current high cost of $900/lb.

TABLE IX

Preliminary TGA of High-Temperature Polyimide Powders (Utilizing 10° C./min Heat Rise Rate in Air).

| POLYIMIDE RESIN TYPE | TOTAL WEIGHT LOSS (%) AT 350° C. | TOTAL WEIGHT LOSS (%) AT 450° C. | MAXIMUM PEAK IN DERIVATIVE CURVE (° C.) |
|---|---|---|---|
| BB-2 | 4.8 | 23.8 | 508 |
| BB-3 | 3.8 | 21.6 | 510 |
| BP-2 | 7.2 | 32.0 | 503 |

Detailed Synthesis Description:
BAPP:PPDA COPOLYIMIDE SOLUON SYNTHESIS PROCEDURE:

The six formulations found in Table II were synthesized in a round bottom, three-neck, 2 L glass reactor equipped with a mechanical agitator, inert nitrogen purge, thermometer, condenser, and an electric heating mantle coupled with a digital controller. The synthesis procedure began by placing the required amount of BTDA anhydride powder in the reactor. Next, approximately half of the method solvent volume was added to the reactor at room temperature. The other portion of the methanol solvent was placed in a wash bottle and saved for later use in the synthesis procedure. Then, the reactor agitator was turned on along with the inert nitrogen purge and the water to the condenser. The temperature controller was then set at 125° C. in order to heat the solution to reflux. On average the solution took 15–30 minutes to reach reflux conditions.

Within 50–65 minutes after the methanol addition, or 25–45 minutes from the start or reflux, the solution turned to clear yellow, which indicated ester formation. At this point a portion of the remaining methanol solvent was used to wash in residual BTDA from the stir rod, thermometer, and sides of the reactor. If the reflux temperature was above 64° C., the controller temperature set point was decreased to 100° C. The reflux was then allowed to continue for 1.0 hours, thus completing the BTDA esterfication reaction.

To reduce the temperature for the diamine addition, the controller was then set at 50° C. Cooling to 45–50° C. normally took 25–40 minutes. The diamines, BAPP along with paraphenylenediamine (PPDA), were then mixed together and added through a neck of the reactor. During the addition of the diamines, agitation was continued and approximately 250 mL of methanol were used to wash in the residual diamine powder.

The solution was then heated to a 45–50° C. reflux with an initial set point of 65° C. The solution was allowed to sit for 1.5 additional hours. At the end of the 1.5 hour hold, the solution was cooled for the nadic monomethyl ester (NON- EXCLUSIVE) addition by setting the temperature controller to 19° C., applying a fan, and eventually removing the mantle. The time to cool down to 31° C.–36° C. was 55–75 minutes in duration. Before the NE was added to the solution, it was crushed using a beaker to remove large "clumps" and to produce mostly fine particles. The remainder of methanol wash was used to rinse residual NE into the reactor. The NE was given 1.5 hours at ambient temperature (27°–36° C.) to mix. Solution density, viscosity, and weight percent solids were measured immediately after the resin was collected.

BAPP:BAX:BIS-P COPOLYIMIDE SOLUTION SYNTHESIS PROCEDURE:

The ten formulations found in Table III were synthesized in a round bottom, three-neck, 2L glass reactor equipped with a mechanical agitator, inert nitrogen purge, thermometer, condenser, and an electric heating mantle coupled with a digital controller. The synthesis procedure began by placing the required amount of BTDA anhydride powder in the reactor. Next, approximately half of the methanol solvent volume was added to the reactor at room temperature. The other portion of methanol solvent was placed in a wash bottle and saved for later use in the synthesis procedure. Then, the reactor agitator was turned on along with the inert nitrogen purge and the water to the condenser. The temperature controller was then set at 135° C. in order to heat the solution to reflux. On average the solution tool 15–25 minutes to reach reflux conditions.

Within 50–65 minutes after the methanol addition, or 25–45 minutes from the start of reflux, the solution turned to clear yellow, which indicated ester formation. At this point, a portion of the remaining methanol solvent was used to wash in residual BTDA from the stir rod, thermometer, and sides of the reactor. The reflux was then allowed to continue for 1.5 hours, thus completing the BTDA esterfication reaction.

To reduce the temperature for the diamine addition, the controller was set at 60° C. Cooling to 45–55° C. normally took 25–40 minutes. The diamines, either BAPP, BAX, BIS-P or combinations thereof were then mixed together and added through a neck of the reactor. During the addition of the diamines, agitation was continued and methanol was used to wash in the residual diamine powder. Combinations of n-methylpyrrolidinone (NMP) and acetone were added between 25–35 weight percent solvent in order to quickly force the diamines into solution. The solutions were then held at elevated temperature for an additional 1–2 hours before continuing. At the end of the hold, the solution was examined for any residual diamine particles that were not soluble.

The solution was then cooled for the nadic monomethyl ester (NE) addition by setting the temperature controller to 19° C., applying a fan, and eventually removing the mantle. The time to cool down to 31° C.–36° C. was 55–75 minutes in duration. Before the NE was added to the solution, it was crushed using a beaker to remove large "clumps" and to produce mostly fine particles. The remainder of methanol wash was used to rinse residual NE into the reactor. The NE was given 1.5 hours at ambient temperature to mix. Solution density, viscosity, and weight percent solids were measured immediately after the resin was collection.

BIS-P:BIS-M:PPDA COPOLYIMIDE SOLUTION SNYTHESIS PROCEDURE:

The ten formulations found in Table III were snythesized in a round bottom, three-neck, 2L glass reactor equipped with a mechanical agitator, inert nitrogen purge, thermometer, condenser, and an electric heating mantle coupled with a digital controller. The synthesis procedure began by placing the required amount of BTDA anhydride powder in the reactor. Next, approximately half of the methanol solvent volume was added to the reactor at room temperature. The other portion of methanol solvent was placed in a wash bottle and saved for later use in the synthesis procedure. Then, the reactor agitator was turned on along with the inert nitrogen purge and the water to the condenser. The temperature controller was then set to 135° C. in order to heat the solution to reflux. On average the solution took 15–25 minutes to reach reflux conditions.

Within 50–65 minutes after the methanol addition, or 25–45 minutes from the start of reflux, the solution turned to clear yellow, which indicated ester formation. At this point, a portion of the remaining methanol solvent was used to wash in residual BTDA from the stir rod, thermometer, and sides of the reactor. If the reflux temperature was above 65° C., the controller temperature set point was decreased to 100° C. The reflux was then allowed to continue for 1.5 yours, thus completing the 1BTDA esterfication reaction.

To reduce the temperature for the diamine addition, the controller was then set at 19° C. Cooling to 40–45° C. normally took 25–40 minutes. (Sometimes the ester solution was allowed to cool down to room temperature overnight under inert nitrogen purge, and then re-heated to 40–45° C. the next morning.) The dianiines, either bisaniline-P or bisaniline-M along with paraphenylenediamine, were then mixed together and added through a neck of the reactor. During the addition of the diamines, agitation was continued and approximately ⅓ of the remaining methanol was used to wash in the residual diamine powder. When the diamines were added, the BIM systems turned dark brown and translucent; however, the BIP systems became yellow/orange, opaque slurries.

The solution was then heated to reflux with an initial set point of 135° C. The solutions took between 15–50 minutes to reach reflux temperature. Once the solution reached temperature, the set point was turned down to 115° C., and the solution was allowed to reflux for 2.0 additional hours. At the end of the two-hour hold, the solution was examined for diamine particles that were not soluble. The BIP-19, BIP-17 and BIP-16 resin systems that contained Bisaniline-P were found not to be completely soluble. N-methylpyrfolidinone (NMP) was added between 2.5–10 weight percent solvent in order to force the Bisaniline-P diamine into solution. The BIP systems were then held at elevated temperature for an additional 15–60 minutes before continuing.

The solution was then cooled for the nadic monomethyl ester (NE) addition by setting the temperature controller to 19° C., applying a fan, and eventually removing the mantle. The time to cool down was 55–75 minutes in duration. Before the NE was added to the solution, it was crushed using a beaker to remove large "clumps" and to produce mostly fine particles. The systmes employed NE to endcap the polymer chains. The remainder of methanol wash was used to rinse residual NE into the reactor. The NE was given 1.5 hours at ambient temperature to mix. The solution density, viscosity, and weight percent solids were measured immediately after the resin was collected. A summary of the results can be found below in Table X.

TABLE X

Physical Test Data

| Systems | Density (g/cc) | Viscosity (cP) @ 21° C. | % Solids |
|---|---|---|---|
| BIP | 0.991–1.000 | 30–40 | 46.4–48.5 |
| BIM | 0.989–1.002 | 30–40 | 45.0–48.2 |

Example 1
Detailed Synthesis Procedure for AMB-20XL Solution

The synthesis of the AMB-20XL resin system began with adding BTDA powder (141.77 grams, 0.440 moles) into a 2 liter, 3-necked glass reactor equipped with a mechanical agitator, inert nitrogen purge, thermometer, condenser, and an electric heating mantle coupled with a digital controller. Next, methanol solvent (215 ml, 5.307 moles) was measured in a graduated cylinder and poured into the reactor. Once the methanol was added to the reactor, agitation was begun, an inert nitrogen sweep was started, and water flow to the condenser was initiated.

The temperature controller was then set to 110° C. to heat the solution to reflux. After 20–30 minutes, the reaction temperature reached 64° C. and began to reflux. After 40 minutes, the system turned to a clear, amber solution, which indicated the esterfication of the anhydride. At this point, any residual BTDA that splashed up the sides of the reactor was rinsed into solution by using a trace amount of methanol. The solution was then allowed to reflux for another 1–1.5 hour to complete the esterfication reaction. At the end of the old, the controller temperature was set to 19° C., and the solution was allowed to cool for approximately 15–20 minutes. While the reaction solution was cooling, 86.33 grams (0.440 moles) of the NE endcap were weighed into a plastic container. Once the solution reached 45–50° C., the NE was added to the reactor and completely washed in with 109 ml (2.690 moles) of methanol. The solution was allowed to mix for at least 1 hour without heat.

Next, 243.84 gram (0.594 moles) of BAPP and 7.14 gram (0.066 moles) of PPDA were weighed out and mixed together. (this represents a 10% molar substitution of BAPP with PPDA.) The diamines were added to the reactor at 33° C. and washed in with 275 ml (3.745 mole) of acetone solvent. The solution was allowed to mix for two hours without heat. The final solution density was measured to be 1.029 g/cc, and the imide solids were measured to be 46.9 weight percent.

Example 2
Synthesis Procedure for AMB-19XL Solution

The synthesis of the AMB-19XL resin system was identical to that outlined in Example 1 for AMB-20XL, except the chemical weights were changed to reflect a 20% molar substitution of BAPP with PPDA. In this example, the monomer weights were: 141.77 grams (0.440 moles) BTDA, 86.33 grams (0.440 moles) NE, 216.74 grams (0.528 moles) BAPP, 14.28 grams (0.132 moles) PPDA, along with 324 ml (7.997 moles) methanol and 250 ml (3.405 moles) acetone. The final solution density was measured to be 1.033 g/cc, and the imide solids were measured to be 48.0 weight percent.

Example 3
Synthesis Procedure for AMB-18XL Solution

The synthesis of the AMB-18XL resin system was identical to that outlined in Example 1 for AMB-20XL, except the chemical weights were changed to reflect a 30% molar substitution of BAPP with 25 mole % PPDA and 5 mole % metaphenylenediamine (MPDA). In this example the monomer weights were: 161.11 grams (0.50 moles) BTDA, 98.10 grams (0.50 moles) NE, 215.51 grams (0.525 moles) BAPP, 20.28 grams (0.188 moles) PPDA, 4.06 grams (0.038 moles) MPDA, along with 369 ml (9.108 moles) methanol and 255 ml (3.473 moles) acetone. The final solution density was measured to be 1.01 g/cc, and the imide solids were measured to be 49.6 weight percent.

Example 4
Synthesis Procedure for AMB-17XL Solution

The synthesis of the AMB-17XL resin system was identical to that outlined in Example 1 for AMB-20XL, except the chemical weights were changed to reflect a 40% molar substitution of BAPP with 30 mole % PPDA and 10 mole % metaphenylenediamine (MPDA). In this example, the monomer weights were: 161.11 grams (0.50 moles) BTDA, 98.10 grams (0.50 moles) NE, 184.73 grams (0.45 moles) BAPP, 24.33 grams (0.225 moles) of PPDA, 8.11 grams (0.075 moles) MPDA, along with 369 ml (9.108 moles) methanol and 227 ml (3.092 moles) acetone. The final solution density was measured to be 1.01 g/cc, and the imide solids were measured to be 50.2 weight percent.

Example 5
Synthesis Procedure for AMB-17XLB Solution

The synthesis of the AMB-17XLB resin system was identical to that outlined in Example 4 for AMB-17XL, except the constituent weights were changed to reflect a 50% molar substitution of BTDA with 50 mole % BPDA. In addition, a larger amount of methanol (437 ml, 10.786 moles) was initially added to the reactor in order to snythesize a 35 weight percent ester solution (instead of 50%) from BTDA and BPDA. This was done because the BPDA esterfication reaction is extremely slow in concentrated solutions. In this example, the monomer weights were: 80.56 grams (0.250 moles) BTDA, 73.55 grams (0.250 moles) BPDA, 98.10 grams (0.50 moles) NE, 184.73 grams (0.45 moles) BAPP, 24.33 grams (0.225 moles) PPDA, 8.11 grams (0.075 moles) MPDA, along with 457 ml (11.280 moles) methanol and 88 ML (1.199 moles) acetone. The final solution density was measured to be 1.02 g/cc, and the imide solids were measured to be 52.3 weight percent.

Example 6
Detailed Synthesis Procedure for BIP-19 Solution

The synthesis of BIP-19 began by placing 120.1 grams (0.373 moles) of BTDA in a 2-liter, 3-necked reactor equipped with a mechanical agitator, inert nitrogen purge, thermometer, condenser, and an electric heating mantle coupled with a digital controller. Next, approximately 170 ml of methanol solven (4.196 moles) was measured in a graduated cylinder and poured into the reactor in such a manner as to wash in any residual BTDA monomer. Once the methanol was added to the reactor, agitation was begun, an inert nitrogen sweep was started, and water flow to the condenser was initiated.

The temperature controller was then set to 125–135° C. to heat the solution to reflux. After about 20–25 minutes, the reaction temperature reached 64° C. and reflux would commence at the lower portion of the condenser. After 35–45 minutes, the system turned into a clear, amber solution, indicating the esterfication of the dianhydride. At this point, any residual BTDA that splashed onto the sides of the reactor was rinsed into solution using a trace amount of methanol. The solution was then allowed to reflux for 1–1.5 hours to complete the esterfication reaction. At the end of the reflux hold, the controller temperature was set to 60–70° C., and the solution was allowed to cool for approximately 30–40 minutes.

Once the system had cooled to a reaction temperature of 50–55° C., 188.1 grams (0.5460 moles) of BIS-P diamine was washed in the reactor with 150 ml (3.702 moles) of methanol, which resulted in yellow slurry. After stirring for one hour, 125 ml (1.290 moles) of 1-methyl-2-pyrrolidinone (NMP) were added as a co-solvent to the mixture to help force the BIS-P diamine into solution. After stirring for one more hour, another 25 ml of NMP were added at a reaction temperature of 57° C. Almost immediately the BIS-P diamine particles went into solution, and the temperature set point was lowered to 19° C. in order to cool the solution down to room temperature for the endcap addition.

After approximately 10–15 minutes at the lower temperature set point, the heating mantle was removed and a fan was applied to aid in cooling the reactor. While the reactor was cooling, the nadic monomethyl ester (NE) endcap powder was crushed or ground to produce very fine powder. After 40–50 minutes the reaction cooled to 26° C., and 73.12 grams (0.373 moles) of NE were added to the solution with agitation. A minimal amount of additional methanol was used to wash in the residual NE powder. The NE was then allowed to mix for 1–1.5 hours at ambient temperature. The final solution density was measured to be 1.03 g/cc, and the imide solids were measured to be 46.9 weight percent. The Brookfield viscosity was estimated at 40–60 cP at 22° C.

Example 7
Synthesis Procedure for BIP-25 Solution

The synthesis of the BIP-25 resin system was identical to that outlined in Example 6 for BIP-19, except the constituent weights were changed to reflect a higher formulated molecular weight. In this example, the monomer weights were: 129.90 grams (0.403 moles) BTDA, 180.84 grams (0.525 moles) BIS-P, 52.73 grams (0.269 moles) NE, along with 331 ml (8.170 moles) methanol and 125 ml (1.290 moles) NMP. The final solution density was measured to be 1.02 g/cc, and the imide solids were measured to be 46.8 weight percent. Once again, the Brookfield viscosity was estimated at 20–60 cP at 22° C.

Example 8
Synthesis Procedure for BIAZ-18 Solution.

The synthesis of the BIAX-18 resin system was similar to that outlined in Example 6 for BIP-19, except the constituent weights were changed to reflect the use of 50 mole % BIS-P/50 mole % BAX as the diamine combination. In addition, methanol, NMP, and acetone were used as solvents. In this example, the monomer weights were: 75.0 grams (0.233 moles) BTDA, 58.74 grams (0.171 moles) BIS-P, 50.35 grams (0.175 moles) BAX, 45.67 grams (0.233 moles) NE, along with 170 ml (4.196 moles) methanol, 61 ml (0.630 moles) NMP, and 37 ml (0.504 moles) acetone. (Note: the NMP and acetone co-solvents were added during the BIS-P/BAX diamine addition.) The final solution density was measured to be 1.03 g/cc, and the imide solids were measured to be 49.3 weight percent. The Brookfield viscosity was estimated at 20–60 cP at room temperature.

Example 9
Synthesis Procedure for BIAZ-24 Solution.

The synthesis of the BIAX-18 resin system was similar to that outlined in Example 8 for BIAX-18, except the constituent weights were changed to reflect a higher formulated molecular weight. In this example, the monomer weights were: 75.0 grams (0.233 moles) BTDA, 52.21 grams (0.152 moles) BIS-P, 44.75 grams (0.155 moles) BAX, 30.45 grams (0.155 moles) NE, along with 150 ml (3.702 moles) methanol, 54 ml (0.557 moles) NMP, and 33 ml (0.449 moles) acetone. The final solution density was measured to be 1.04 g/cc, and the imide solids were measured to be 50.4 weight percent. The Brookfield viscosity was estimated at 20–60 cP at ambient temperature.

Example 10
Synthesis Procedure for BIAP-20 Solution.

The synthesis of the BIAP-20 resin system was similar to that outlined in Example 8 for BIAX-18, except the constituent weights were changed to reflect the use of 50 mole % BIS-P/50 mole % BAPP as the diamine combination. In this example, the monomer weights were: 70.0 grams (0.217 moles) BTDA, 54.82 grams (0.159 moles) BIS-P, 66.88 grams (0.163 moles) BAPP, 42.62 grams (0.217 moles) NE, along with 170 ml (4.196 moles) methanol, 63 ml (0.650 moles) NMP, and 38 ml (0.518 moles) acetone. The final solution density was measured to be 1.044 g/cc, and the imide solids were measured to be 51.6 weight percent. The Brookfield viscosity was measured to be 40 cP at 22.5° C.

Section 11
Synthesis Procedure for BIAP-26 Solution.

The synthesis of the BIAP-26 resin system was similar to that outlined in Example 10 for BIAP-20, except the constituent weights were changed to reflect a higher formulated molecular weight. In this example, the monomer weights were: 75.0 grams (0.233 moles) BTDA, 52.21 grams (0.152 moles) BIS-P, 63.70 grams (0.155 moles) BAPP, 30.45 grams (0.155 moles) NE, along with 165 ml (4.073 moles) methanol, 60 ml (0.619 moles) NMP, and 36 ml (0.490 moles) acetone. The final solution density was measured to be 1.046 g/cc, and the imide solids were measured to be 52.0 weight percent. The Brookfield viscosity was measured to be 60 cP at 22.5° C.

Example 12
Synthesis Procedure for AXAP-19 Solution.

The synthesis of the AXAP-20 resin system was similar to that outlined in Example 8 for BIAX-18, except the constituent weights were changed to reflect the use of 50 mole % BAX/50 mole % BAPP as the diamine combination. In this example, the monomer weights were: 70.0 grams (0.217 moles) BTDA, 46.99 grams (0.163 moles) BAX, 66.88 grams (0.163 moles) BAPP, 42.62 grams (0. .217 moles) NE, along with 165 ml (4.073 moles) methanol, 61 ml (0.630 moles) NMP, and 37 ml (0.504 moles) acetone. The final solution density was measured to be 1.043 g/cc, and the imide solids were measured to be 48.6 weight percent. The Brookfield viscosity was measured to be 40–60 cP at 22.5° C.

Example 13
Synthesis Procedure for AXAP-25 Solution

The synthesis of the AXAP-25 resin system was similar to that outlined in Example 12 for AXAP-19, except the constituent weights were changed to reflect a higher formulated molecular weight. In this example, the monomer weights were: 80.0 grams (0.248 moles) BTDA, 47.73 grams (0.166 moles) BAX, 67.95 grams (0.166 moles) BAPP, 32.48 grams (0.166 moles) NE, along with 160 ml (3.949 moles) methanol, 61 ml (0.630 moles) NMP, and 37 ml (0.504 moles) acetone. The final solution density was measured to be 1.043 g/cc, and the imide solids were measured to be 48.5 weight percent. The Brookfield viscosity was estimated at 40–60 cP at room temperature.

Example 14
Detailed Synthesis Procedure for BIP-16 Solution

The synthesis of the BIP-16 system began with the anhydride addition to the reactor. The BTDA powder (305.90 grams, 0.949 moles) was placed in a 2 liter, 3-necked reactor. Next, approximately one half of the required methanol solvent (590 ml, 14.562 moles) was measured in a graduated cylinder. The 590 ml were poured into the reactor, while the remaining 500 ml (12.341 moles) were stored in a solvent wash bottle. Once the methanol was added to the reactor, agitation was begun, an inert nitrogen sweep was started, and water flow to the condenser was initiated.

The temperature controller was then set to 135° C. to heat the solution to reflux conditions. After 20 minutes, the reaction temperature reached 64° C. and reflux began. The controller was then set to 115° C. to maintain the reflux. After 35 minutes, the system turned to a clear, yellow solution. At this point any residual BTDA was rinsed into solution using the methanol wash. The temperature set point was decreased again to 100° C. and the solution was allowed to reflux for 1.5 hours more. At the end of the reflux hold, the controller temperature was set to 19° C. to cool.

Once the system had cooled for 20 minutes to a temperature of 56° C., agitation was ceased and the heating mantle was turned off. The solution was allowed to sit overnight with a nitrogen purge on to prevent air from entering the reaction set-up.

The next morning, the temperature set point was increased to 95° C. and agitation was resumed along with water flow to the condenser. While the reaction was heating, 343.40 grams (0.997 moles) of bisaniline-P (BIS-P) and 46.20 grams (0.427 moles) of paraphenylenediamine (PPDA) were weighed out and mixed together. After 20 minutes of heating, the reaction temperature had reached 50° C. so the temperature set point was lowered to 60° C. to prevent from reaching methanol's boiling point (65° C.). Finally, the diamines were added through a funnel. The remainder of the methanol wash was required to rinse in the entire diamine residue. The solution became a yellow/orange slurry upon the diamine addition. The temperature controller was then set again to 135° C. to promote reflux.

After 20 minutes at that temperature set, the reaction temperature rose to 63° C. and reflux began. The controller set was lowered to 115° C. to maintain the reflux temperature. After 2.25 hours of reflux, the solution was examined and it was found that there were particles not in solution. N-methylpyrrolidinone (NMP) (22.40 grams, 0.232 moles, 2.5 weight percent solvent) was added to force the insoluble particles into solution. Almost immediately the particles went into solution and the temperature set was lowered to 19° C. to cool the solution for the endcap addition.

After approximately 15 minutes at the lower temperature set, the heating mantle was removed and a fan was applied to aid in cooling the reactor. While the reactor was cooling, the nadic monomethyl ester (NE) endcap was weighed and then crushed to produce very fine particles. After 60 minutes the reaction had cooled to 31° C., 186.30 grams (0.949 moles) of NE were added to the solution with agitation. A minimal amount of additional methanol was used to wash in the residual NE powder. The NE was then allowed to mix for 1.5 hours at ambient temperature (26° C.).

After the endcap had mixed, the solution was poured into 2-quart containers. Density, viscosity, and percent solids test were run on the system immediately following the pour. The density was measured to be 0.996 g/cc, while the viscosity was reported as 30.0–40 cP at 23° C. The solution was found to be 47.9% solids.

Example 15
Synthesis Procedure for BIP-19 Solution.

The synthesis procedure for BIP-19 is the same as that stated above in Example 14; however, the monomer weights utilized changed along with specific reflux temperatures. The mass of BTDA added to the reactor was 271.60 grams (0.843 moles). Approximately 1065 ml of methanol solvent (842.42 grams, 26.286 moles) were required throughout the synthesis. The solution's reflux temperature was 65° C. With BIP-19 being specified to contam 100% BIS-P, the mass of diamine added was 435.60 grams (1.264 moles). The solution's reflux temperature decreased to 61° C. At the end of two hours, the solution was examined and it was found that not all of the BIS-P diamine had dissolved.

After adding the remaining methanol solvent that had been saved for wash and refluxing another hour, the diamine still had not solvated completely. To solvate the diamine completely, 10% by weight (88.00 grams, 0.888 moles) NMP was added. The mass of NE endcap added was 165.40 grams (0.843 moles). The density, viscosity, and percent solids of BIP-19 were 0.998 g/cc, 30–40 cP at 21° C., and 48.5% respectively.

Example 16
Synthesis Procedure for BIP-17 Solution.

The synthesis procedure for BIP-17 is the same as that stated above in Example 14; however, the monomer weights utilized changed along with specific reflux temperatures. The mass of BTDA added to the reactor was 293.60 grams (0.911 moles). Approximately 1083 ml of methanol solvent (856.65 grams, 26.730 moles) were required throughout the synthesis. The solution's reflux temperature was 66° C. With BIP-17 being specified to contain 80% BIS-P, the mass of diamine added was 376.60 grams (1.093 moles) of BIS-P and 29.60 grams (0.273 moles) of PPDA. The solution's reflux temperature remained at 66° C. At the end of two hours, the solution was examined and it was found that not all of the BIS-P diamine had dissolved.

To solvate the diamine completely, 5% by weight (44.0 grams, 0.444 moles) NMP solvent was added. The mass of NE endcap added was 178.70 grams (0.911 moles). The density, viscosity, and percent solids of BIP-17 were 0.991 g/cc, 30 cP at 21° C., and 47.7% respectively.

Example 17
Synthesis Procedure for BIP-15.5 Solution

The synthesis procedure for BIP-15.5 is the same as that stated above in Example 14; however, the monomer weights utilized changed along with specific reflux temperatures. The mass of BTDA added to the reactor was 305.90 grams (0.949 moles). Approximately 1060 ml of methanol solvent (838.46 grams, 26.163 moles) were required throughout the synthesis. The solution's reflux temperature was 62° C. With BIP-15.5 being specified to contain 60% BIS-P, the mass of diamine added was 294.30 grams (0.854 moles)of BIS-P and 61.60 grams (0.569 moles) of paraphenylenediamine (PPDA). The solution's reflux temperature increased to 64° C. At the end of two hours, the solution was examined and it was found that all of the BIS-P had dissolved. The mass of (NE) endcap added was 186.30 grams (0.949 moles). The density, viscosity, and percent solids of BIP-15.5 were 1.00 g/cc, 40 cP at 19.5° C., and 46.7% respectively.

Example 18
Synthesis Procedure for BIP-15 Solution.

The synthesis procedure for BIP-15 is the same as that stated above in Example 14; however, the monomer weights utilized changed along with specific reflux temperatures.

The mass of BTDA added to the reactor was 316.50 grams (0.982 moles). Approximately 1055 ml of methanol solvent (834.51 grams, 26.039 moles) were required throughout the synthesis. The solution's reflux temperature was 62° C. With BIP-15 being specified to contain 50% BIS-P, the mass of diamine added was 253.80 grams (0.737 moles)of BIS-P and 79.70 grams (0.737 moles) of PPDA. The solution's reflux temperature increased to 63° C. The mass of NE endcap added was 192.70 grams (0.982 moles). The density, viscosity, and percent solids of BIP-15 were 0.998 g/cc, 40 cP at 19.5° C., and 46.4% respectively.

Example 19
Detailed Synthesis Procedure for BIM-15.5 Solution.

The synthesis of the BIM-15.5 system began with the anhydride addition to the reactor. The BTDA powder (305.90 grams, 0.949 moles) was placed in a 2 liter, 3-necked reactor. Next, approximately one half of the required methanol solvent (556 ml, 13.723 moles) was measured in a graduated cylinder. The 556 ml were poured into the reactor, while the remaining 500 ml (12.341 moles) were stored in a solvent wash bottle. Once the methanol was added to the reactor, agitation was begun, an inert nitrogen sweep was started, and water flow to the condenser was initiated.

The temperature controller was then set to 135° C. to heat the solution to reflux conditions. After 15 minutes, the reaction temperature reached 53° C. and reflux began. The controller was then set to 115° C. to maintain the reflux. After 45 minutes at 115° C., the system turned to a clear, yellow solution. At this point any residual BTDA was rinsed into solution using the methanol wash. The temperature set point was decreased again to 100° C. and the solution was allowed to reflux for 1.5 hours more. At the end of the reflux hold, the controller temperature was set to 19° C. to cool.

Once the system had cooled for 15 minutes, agitation was ceased and the heating mantle was turned off. The solution was allowed to sit overnight with a nitrogen sweep on it to prevent air from entering the reaction set-up.

The next morning, the temperature set point was increased to 95° C. and agitation was resumed along with water flow to the condenser. While the reaction was heating, 294.30 grams (0.854 moles) of BIS-M and 61.60 grams (0.570 moles) of paraphenylenediamine (PPDA) were weighed out and mixed together. After 45 minutes of heating, the reaction temperature had reached 54° C. and the diamines were added through a funnel. Approximately half of the methanol wash (250 ml, 6.170 moles)was required to rinse in the diamine residue. The solution became a yellow/orange slurry upon the diamine addition. The temperature controller was then set again to 135° C. to promote reflux.

After 15 minutes at that temperature set, the reaction temperature rose to 61° C. and reflux began. After 1.0 hour of reflux, the solution was examined, and it was found that no insoluble diamine particles remained. The temperature set was lowered to 19° C. to cool the solution for the endcap addition.

After approximately 5 minutes at the lower temperature set, the heating mantle was removed and a fan was applied to aid in cooling the reactor. While the reactor was cooling, the nadic monomethyl ester (NE) endcap was weighed and then crushed to produce very fine particles. After 85 minutes the reaction had cooled to 34° C., 186.30 grams (0.949 moles) of NE were added to the solution with agitation. A minimal amount of additional methanol was used to wash in the residual NE powder. The NE was then allowed to mix for 1.5 hours at ambient temperature (28° C.).

After the endcap had mixed, the solution was poured into 2-quart containers. Density, viscosity, and percent solids test were performed on the system immediately following the pour. The density was measured to be 0.993 g/cc, while the viscosity was reported as 30.0 cP at 21° C. The solution was found to be 45.4% solids.

Example 20
Synthesis Procedure for BIM-19 Solution.

The synthesis procedure for BIM-19 followed that of the detailed procedure stated in Example 19 except that the monomer weights and specific reflux temperatures changed. To begin, 271.60 grams (0.843 moles) of BTDA was used and a total of 1065 ml (842.42 grams, 26.286 moles) methanol solvent was needed throughout the reaction. The solution's reflux temperature was 65° C. With BIM-19 being specified to be 100% BIS-M, the diamine mass added was 435.60 grams (1.264 moles). The solution's reflux temperature decreased to 61° C. The mass of NE endcap added was 165.40 grams (0.843 moles). The density, viscosity, and percent solids of BIM-19 were 0.989 g/cc, 30 cP at 21° C., and 48.0% respectively.

Example 21
Synthesis Procedure for BIM-17 Solution

The synthesis procedure for BIM-17 followed that of the detailed procedure stated in Example 19 except that the monomer weights and specific reflux temperatures changed. To begin, 293.60 grams (0.911 moles) of BTDA was used and a total of 1083 ml (856.65 grams, 26.730 moles) methanol solvent was needed throughout the reaction. The solution's reflux temperature was 67° C. With BIM-17 being specified to be 80% BIS-M, the diamine mass added was 376.60 grams (1.093 moles) of BIS-M and 29.60 grams (0.273 moles) of PPDA. The solution's reflux temperature decreased to 62° C. The mass of NE endcap added was 178.70 grams (0.911 moles). The density, viscosity, and percent solids of BIM-17 were 0.9897 g/cc, 30 cP at 21° C., and 48.2% respectively.

Example 22
Synthesis Procedure for BIM-16 Solution.

The synthesis procedure for BIM-16 followed that of the detailed procedure stated in Example 19 except that the monomer weights and specific reflux temperatures changed. Also, the synthesis for BIM-16 was accomplished over two days. To begin, 305.90 grams (0.949 moles) of BTDA was used and a total of 1090 ml (862.19 grams, 26.903 moles) methanol solvent was needed throughout the reaction. The solution's reflux temperature was 64° C. The solution was allowed to cool overnight prior to the diamine addition. With BIM-16 being specified to be 70% BIS-M, the diamine mass added was 343.40 grams (0.997 moles) of BIS-M and 46.20 grams (0.427 moles) of PPDA. The solution's reflux temperature remained at 64° C. The mass of NE endcap added was 186.30 grams (0.949 moles). The density, viscosity, and percent solids of BIM-16 were 1.002 g/cc, 30–40 cP at 21° C., and 47.0% respectively.

Example 23
Synthesis Procedure for BIM-15 Solution.

The synthesis procedure for BIM-15 followed that of the detailed procedure stated in Example 19 except that the monomer weights and specific reflux temperatures changed. To begin, 316.50 grams (0.982 moles) of BTDA was used and a total of 1055 ml (834.51 grams, 26.039 moles) methanol solvent was needed throughout the reaction. The solution's reflux temperature was 62° C. The solution was allowed to cool overnight again. With BIM-15 being specified to be 50% BIS-M, the diamine mass added was 253.80 grams (0.737 moles) of BIS-M and 79.70 grams (0.737 moles) of PPDA. The solution's reflux temperature remained at 62° C. The mass of NE endcap added was 192.70 grams (0.982 moles). The density, viscosity, and percent solids of BIM-15 were 0.991 g/cc, 30–40 cP at 21° C., and 45.0% respectively.

OLIGOMER POWDER SYNTHESIS PROCEDURE

The general synthesis procedure for producing polyimide powders included reacting the dianhydride with the diamine (25% monomer solids) for two hours in a suitable reactor at 55° C., using n-methylpyrrolidinone (NMP) as the solvent. Once the short-chain poly(amic-acid) was formed, the nadic anhydride end-cap was added and allowed to react for one additional hour. Next, the entire mixture was heated to 180° C. for two hours in order to thermally imidize the poly(amic-acid). Condensation by-products were removed and collected in a Dean-Stark trap in order to force the imidization reaction to completion. The mixture was allowed to cool to room temperature, which usually resulted in viscous slurry.

Precipitation of the polyimide oligomers from the slurry was tried with limited success by using the following non-solvents: acetone, hexane, methanol, toluene, and water. Since the precipitation experiments did not produce a clear favorite, inexpensive water was used as the non-solvent for all formulations. Following precipitation of the oligomers, the slurries were filtered and dried in an air re-circulating oven before being ground into powder.

Example 24

Detailed Synthesis Procedure for 6FB-1 Polyimide Oligomer Powder.

A similar reactor set-up to the ester solution's was employed for the powder synthesis procedure, except that a Dean-Stark Trap was used to connect the condenser to the reactor. The Dean-Stark Trap was needed to collect condensate during the polymerization. A Claisen adapter was used to incorporate the thermometer and the nitrogen sweep inlet. Before beginning the reaction, all glassware was assembled and flamed to remove moisture.

The synthesis started with the addition of n-methylpyrrolidinone (NMP) solvent to the reactor at room temperature. A total solvent volume of 620 ml (6.400 moles) was needed so 300 ml (3.097 moles) were placed in the reactor, while 320 ml (3.303 moles) were poured into a solvent wash bottle for later use in the synthesis. Upon the solvent addition to the reactor, the temperature controller's set point was increased to 100° C. The solvent was allowed to heat for 30 minutes to a temperature of 59° C. To maintain the temperature, the set point was reduced to 60° C.

With the temperature above 55° C., the diamnine was added to the reactor. The required amount of Bisaniline-P (BIS-P) was 99.17 grams (0.288 moles). Approximately ⅓ of the solvent wash volume was used to rinse in the diamine residue from the funnel and sides of the reactor.

Immediately following the completion of the diamine addition, the anhydride was added. After the 63.94 grams (0.144 moles) of 6FDA were added slowly to the solution, another ⅓ of the solvent wash was used to rinse in all anhydride residue. The addition of the anhydride resulted in an exothermic reaction that increased the reaction temperature from 53° C. to 68° C. After several minutes, the temperature leveled off to 65° C.

The resin system was then cooled for 2.0 hours by setting the controller to 50° C. At the end of the hold, the reaction temperature was 45° C., a suitable temperature for the endcap addition. Therefore, 47.26 grams (0.288 moles) of 5-norbornene 2,3-dicarboxylic anhydride (NA) were added to the reactor and rinsed with the remaining portion of wash solvent.

After allowing the endcap to mix for 1.0 hour at 45° C., the heating mantle was turned off. The system was then cooled to a temperature of 35° C. before agitation was ceased. The inert nitrogen purge was continued overnight to prevent air and moisture from contaminating the reaction mixture.

The next morning, the solution temperature was 25° C. Agitation was resumed before the heating mantle was turned back on and the controller was set to 200° C. To prevent convective heat loss, insulation was placed around all exposed surfaces of the reactor except for the graduated cylinder side of the Dean-Stark Trap. After 10 minutes of heating, the reaction temperature had reached 79° C. and the solution had turned green. The set point was increased to 230° C. The solution reached 124° C. after 15 minutes at the higher set point. The set point was raised again to 300° C. Reflux occurred 15 minutes later at 179° C. The temperature set point was reduced to 240° C., and the solution was held at reflux for 2.0 hours. The initial volume of condensate collected in the Dean-Stark Trap was 5.8 ml.

During the reflux hold, the temperature was held at 180° C. by reducing the temperature set point to 230° C. At the end of 2.0 hours, the set point was reduced to 19° C. The system was poured into a glass dish 40 minutes later at a temperature of 141° C. The total condensate volume collected once the reactor had cooled was 20.0 ml. Later in the day, the polymer had precipitated from solution producing a yellow slurry.

The polyimide slurry was then vacuum filtered using a large Buchner funnel, suction filtration flask, and vacuum pump. To thoroughly wash the slurry of solvent, extensive measures were taken. First of all, 10 tablespoons of slurry were placed in a blender with 400 ml (22.210 moles) of water and blended. After pouring the blender's contents into the f&nMel, an additional 1.5 L (83.287 moles) of water were used to wash the blender and the filtered powder. The filtered powder was very fme and light cream in color.

The powder was transferred from the Buchner funnel into another glass dish and placed in an air-recirculating oven to dry. The oven was gradually ramped up to 200° C. and then held at that temperature for 4 hours. The dried powder was then ground and placed in a plastic bag. Approximately 164 grams of polyimide powder were recovered. The polyimide powder was either resin transfer molded into carbon fiber reinforced composites, or compression molded into neat resin specimens.

With the temperature above 55° C., the diamine was added to the reactor. The required amount of Bisaniline-P (BIS-P) was 9.17 grams (00.288 moles). Approximately ⅓ of the solvent wash volume was used to rinse in the diamine residue from the funnel and sides of the reactor.

Immediately following the completion of the diamine addition, the anhydride was added. After the 63,94 grams (0.144 moles) of 6FDA were added slowly to the solution, another ⅓ of the solvent wash was used to rinse in all anhydride residue. The addition of the anhydride resulted in an exothermic reaction that increased the reaction temperature from 53° C. to 68° C. After several minutes, the temperature leveled off to 65° C.

The resin system was then cooled for 2.0 hours by setting the controller to 50° C. At the end of the hold, the reaction temperature was 45° C., a suitable temperature for the endcap addition. Therefore, 47.26 grams (0.288 moles) of 5-norbornene 2,3-dicarboxylic anhydride (NA) were added to the reactor and rinsed with the remaining portion of wash solvent.

After allowing the endcap to mix for 1.0 hour at 45° C., the heating mantle was turned off. The system was then cooled to a temperature of 35° C. before agitation was ceased. The inert nitrogen purge was continued overnight to prevent air and moisture from contaminating the reaction mixture.

The next morning, the solution temperature was 25° C. Agitation was resumed before the heating mantle was turned back on and the controller was set to 200° C. To prevent convective heat loss, insulation was placed around all exposed surfaces of the reactor except for the graduated cylinder side of the Dean-Stark trap. After 10 minutes of heating, the reaction temperature had reached 79° C. and the solution had turned green. The set point was increased to 230° C. The solution reached 124° C. after 15 minutes at the higher set point. The set point was raised again to 300° C. Reflux occurred 15 minutes later at 179° C. The temperature set point was reduced to 240° C., and the solution was held at reflux for 2.0 hours. The initial volume of condensate collected in the Dean-Stark trap was 5.8 ml.

During the reflux hold, the temperature was held at 180° C. by reducing the temperature set point to 230° C. At the end of 2.0 hours, the set point was reduced to 19° C. The system was poured into a glass dish 40 minutes later at a temperature of 141° C. The total condensate volume collected once the reactor had cooled was 20.0 ml. Later in the day, the polymer had precipitated from solution producing a yellow slurry.

The polyimide slurry was then vacuum filtered using a large Buchner funnel, suction filtration flask, and vacuum pump. To thoroughly was the slurry of solvent, extensive measures were taken. First of all, 10 tablespoons of slurry were placed in a blender with 400 ml (22.210 moles) of water and blended. After pouring the blender's contents into the finnel, and additional 1.5 L (83.287 moles) of water were used to wash the blender and the filtered powder. The filtered powder was very fine and light cream in color.

The powder was transferred from the Buchner funnel into another glass dish and placed in an air-recirculating over to dry. The oven was gradually ramped up to 200° C. and then held at that temperature for 4 hours. The dried powder was then ground and placed in a plastic bag.

Approximately 164 grams of polyimide powder were recovered. The polyimide powder was either resin transfer molded into carbon fiber reinforced composites, or compression molded into neat resin specimens.

Example 25
Detailed Synthesis Procedure for BTB-Polyimide Oligomer Powder

The detailed procedure outlined in Example 24 was also used to synthesize the BTB-1 system; however, BTDA was used instead of 6FDA.

A total of 400 ml (4.129 moles) of NMP solvent was used throughout this procedure, while 68.10 grams (0.1298 moles) of BIS-P were placed in the reactor at the start of the synthesis. The mass of BTDA added was 31.85 grams (0.099 moles). The anhydride addition caused an exothermic reaction that raised the solution temperature to 65° C. The mass of NA endcap added was 32.45 grams (0.198 moles).

The next morning the solution was heated to reflux (185° C.). During the reflux hold, 12.0 mo of reaction by-products were collected in the Dean-Stark trap. The solution was then poured into a glass dish at 66° C. and allowed to precipitate for several days. The slurry was then filtered, dried, and ground as usual.

Example 26
Synthesis Procedure for 6FB-2 Polyimide Oligomer Powder

The detailed procedure outlined in Example 24 was also used to synthesize the 6FB-2 system; however, as a result of the higher molecular weight, the monomer weights did change.

A total of 660 ml (6.813 moles) of NMP solvent was used throughout this procedure, while 103.35 grams (0.300 moles) of BIS-P were placed in the reactor at the start of the synthesis. The mass of 6FDA added was 88.85 grams (0.200 moles). The anhydride addition caused an exothermic reaction that raised the solution temperature to 69° C. The mass of NA endcap added was 32.83 grams (0.200 moles).

The next morning the solution was heated to reflux (185° C.). During the reflux hold, 14.8 ml of reaction by-products were collected in the Dean-Stark trap. The solution was then poured into a glass dish at 135° C. and allowed to precipitate for several days. The slurry was then filtered, dried, and ground as usual.

Example 27
Synthesis Procedure for BB-1 Polyimide Oligomer Powder

The detailed procedure outlined in Example 24 was also used to synthesize the BB-1 system; however, BPDA was used in the place of 6FDA.

A total of 629 grams (6.35 moles) of NMP solvent was used throughout this procedure, while 111.17 grams (0.323 moles) of BIS-P were placed in the reactor at the start of the synthesis. The mass of BPDA added was 47.47 grams (0.161 moles). The anhydride addition caused an exothermic reaction that raised the solution temperature to 78° C. The mass of NA endcap added was 52.97 grams (0.323 moles).

The next morning the solution was heated to reflux (189° C.). During the reflux hold, 8.2 ml of reaction by-products were collected in the Dean-Stark trap. The solution was then poured into a glass dish at 138° C. and allowed to precipitate for several days. The slurry was then filtered, dried, and ground accordingly.

Example 28
Synthesis Procedure for BB-2 Polyimide Oligomer Powder

The detailed procedure outlined in Example 24 was also used to synthesize the BB-2 system; however, BPDA was used instead of 6FDA. Also, as a result of the increased molecular weight, the monomer weights changed.

A total of 722.40 grams (7.297 moles) of NMP solvent was used throughout this procedure, while 129.18 grams (0.375 moles) of BIS-P were placed in the reactor at the start of the synthesis. The mass of BPDA added was 73.55 grams (0.250 moles). The anhydride addition caused an exothermic reaction that raised the solution temperature to 75° C. The mass of NA endcap added was 41.04 grams (0.250 moles).

The solution was then mixed for one hour before being heated to reflux (200° C.). During the reflux hold 20.0 ml of reaction by-products were collected in the Dean-Stark trap. The solution was then cooled and stirred overnight. The solution had to be removed from the reactor the next morning using 700 ml (38.857 moles) of water to encourage precipitation. The slurry could not be filtered because of the excess water, so it was dried in an oven before being filtered. The powder was then dried again at 200° C. for 4.0 hours after a gradual ramp to that temperature. Finally, the powder was ground and placed in a plastic bag.

Example 29
Synthesis Procedure for BB-3 Polyimide Oligomer Powder

The detailed procedure outlined in Example 24 was also used to synthesize the BB-3 system; however, BPDA was used instead of 6FDA. Also, as a result of the increased molecular weight, the monomer weights changed.

A total of 767.00 grams (7.747 moles) of NMP solvent was used throughout this procedure, while 137.79 grams (0.400 moles) of BIS-P were placed in the reactor at the start of the synthesis. The mass of BPDA added was 88.26 grams (0.300 moles) of BPDA were added. The anhydride addition caused an exothermic reaction that raised the solution temperature to 70° C. The mass of NA endcap added was 32.83 grams (0.200 moles) of NA endcap were added at 52° C.

The solution was then mixed for one hour before being heated to reflux (200° C.). During the reflux hold 30.0 ml of reaction by-products were collected in the Dean-Stark trap. The solution was then cooled and stirred overnight. The solution had to be removed from the reactor the next morning using 700 ml (38.857 moles) of water to encourage precipitation. The slurry could not be filtered because of the excess water, so it was dried in an oven before being filtered. The powder was then dried again at 200° C. for 4.0 hours after a gradual ramp to that temperature. The powder was then ground and placed in a plastic bag.

Example 30

Synthesis Procedure for BPM-2 Polyimide Oligomer Powder

The detailed procedure outlined in Example 24 was also used to synthesize the BPM-2 system; however, BPDA was used instead of 6FDA and the higher molecular weight required that the monomer weights change. Also, 50% metaphenylenediamine (MPDA) substitution, with 50% paraphenylenediamine (PPDA), was added to improve processability.

A total of 744.00 grams (7.515 moles) of NMP solvent was used throughout this procedure, while 32.44 grams (0.300 moles) of PPDA and 32.44 grams (0.300 moles) of MPDA were placed in the reactor at the start of the synthesis. The mass of BPDA added was 117.68 grams (0.400 moles). The anhydride addition caused an exothermic reaction that raised the solution temperature to 75° C. The mass of NA endcap added was 65.66 grams (0.400 moles).

The solution was then mixed for one hour before being heated to reflux (175° C.). During the reflux hold 19.0 ml of reaction by-products were collected in the Dean-Stark trap. The solution was then cooled and poured. A portion of solution had to be removed from the reactor with an NMP rinse. The slurry was then filtered, dried, and ground.

Example 31

Synthesis Procedure for BPM-3 Polyimide Oligomer Powder

The detailed procedure outlined in Example 24 was also used to synthesize the BPM-3 system; however, BPDA was used instead of 6FDA and the higher molecular weight required that the monomer weights change. Also, 50% Metaphenylenediamine substitution, with 50% paraphenylenediamine (PPDA) was added to improve processability.

A total of 738.00 grams (7.454 moles) of NMP solvent was used throughout this procedure, while 32.441 grams (0.300 moles) of PPDA and 32.44 grams (0.300 moles) of MPDA were placed in the reactor at the start of the synthesis. The mass of BPDA added was 132.39 grams (0.450 moles). The anhydride addition caused an exothermic reaction that raised the solution temperature to 80° C. The mass of NA endcap added was 49.25 grams (0.300 moles).

The solution was then mixed for one hour before being heated to reflux (175° C.). During the reflux hold 20.3 ml of reaction by-products were collected in the Dean-Stark trap. The solution was then cooled and poured. A portion of solution had to be removed from the reactor with an NMP rinse. The slurry was filtered, dried and ground.

Example 32

Synthesis Procedure for PB-2 Polyimide Oligomer Powder

The detailed procedure outlined in Example 24 was also used to synthesize the PB-2 system; however, PMDA was used instead of 6FDA and the higher molecular weight required that the monomer weights change.

A total of 665.00 grams (6.717 moles) of NMP solvent was used throughout this procedure, while 129.19 grams (0.375 moles) of BIS-P were placed in the reactor at the start of the synthesis. The mass of PMDA added was 54.53 grams (0.250 moles). The anhydride addition caused an exothermic reaction that raised the solution temperature to 72° C. The mass of NA endcap added was 41.04 grams (0.250 moles).

The solution was then mixed for one hour before being heated to reflux (180° C.). During the reflux hold, 12.0 ml of reaction by-products were collected in the Dean-Stark trap. The solution was then cooled and poured. The slurry was filtered, dried and ground.

Example 33

Synthesis Procedure for PB-3 Polyimide Olgomer Powder

The detailed procedure outlined in Example 24 was also used to synthesize the PB-3 system; however, PMDA was used instead of 6FDA and the higher molecular weight required that the monomer weights change.

A total of 698.55 grams (7.056 moles) of NMP solvent was used throughout this procedure, while 137.81 grams (0.400 moles) of BIS-P were placed in the reactor at the start of the synthesis. The mass of PMDA added was 65.44 grams (0.300 moles). The anhydride addition caused an exothermic reaction that raised the solution temperature to 76° C. The mass of NA endcap added was 32.83 grams (0.300 moles).

The solution was then mixed for one hour before being heated to reflux (183° C.). During the reflux hold, 8.0 ml of reaction by-products were collected in the Dean-Stark trap. The solution was then cooled and poured. The slurry was filtered, dried and ground.

Example 34

Synthesis Procedure for 6FB-Star Polyimide Oligomer Powder

The detailed procedure outlined in Example 24 was also used to synthesize the 6FB-Star system. However, 6FDA was used in the place of BTDA and a triamine, 1,3,5,-tri(4-amino phenoxy)benzene, was also added to synthesize a system with a star configuration The triamine used was an experimental product provided by the NASA-Lewis Research Center.

A total of 325.60 grams (3.370 moles) of NMP solvent was used throughout this procedure, while 36.23 grams (0.105 moles) of BIS-P were placed in the reactor at the start of the synthesis. The mass of 6FDA added was 46.71 grams (0.105 moles). The anhydride addition caused an exothermic reaction that raised the solution temperature to 68° C. After a two-hour hold and 80 minutes of cooling, 14.00 grams (0.035 moles) of the experimental triamine were added. Upon the addition of the triamine, the solution viscosity increased noticeably. The mass of NA endcap added was 17.26 grams (0.105 moles).

The next morning the solution was heated to reflux (185° C.). During the reflux hold, 17.8 ml of reaction by-products were collected in the Dean-Stark trap. The solution was then poured into a glass dish at 66° C. and allowed to precipitate for several days. The slurry was then filtered, dried and ground.

Example 35
MP-7 Polyimide Oligomeric Powder Detailed Synthesis Procedure

A similar reactor set-up to the ester solution's was employed for the powder synthesis procedure, except that a Dean-Stark Trap was used to connect the condenser to the reactor. The Dean-Stark Trap was needed to collect condensate during the polymerization. A Claisen adapter was used to incorporate the thermometer and the nitrogen sweep inlet. Before beginning the reaction, all glassware was assembled and flamed to remove moisture.

The synthesis started with the addition of n-methylpyrrolidinone (NMP) solvent to the reactor at room temperature. A total solvent volume of 1148.4 ml (11.886 moles) was needed so 800 ml (8.280 moles) were placed in the reactor, while 350 ml (3.622 moles) were poured into a solvent wash bottle for later use in the synthesis. Upon the solvent addition to the reactor, the temperature controller's set point was increased to 50° C. The solvent was allowed to heat for 10 minutes to a temperature of 25° C. To maintain the heating of the solution, the set point was raised to 60° C.

When the temperature exceeded 40° C., the diamines were added to the reactor. The required amount of Bisaniline-P (BIS-P) was 68.20 grams (0.198 moles), while 21.40 grams (0.062 moles) of paraphenylenediamine (PPDA) were added. Approximately ½ of the solvent wash volume was used to rinse in the diamine residue from the funnel and sides of the reactor.

Immediately following the completion of the diamine addition, the anhydride was added. After the 117.70 grams (0.400 moles) of biphenyldianhydride (BPDA) were added slowly to the solution, the remaining solvent wash was used to rinse in all anhydride residue. The addition of the anhydride resulted in an exothermic reaction that increased the reaction temperature from 46° C. to 61° C. After several minutes, the temperature leveled off to 55° C. and was held for 2.0 hours.

The resin system was then cooled by setting the controller to 19° C. At the end of the day, the reaction temperature was 52° C., a suitable temperature to shut down the system for an overnight hold. The inert nitrogen purge was continued overnight to prevent air and moisture from contaminating the reaction mixture.

The following morning, the solution temperature was 18° C. Agitation was resumed before the heating mantle was turned back on and the controller was set to 180° C. To prevent convective heat loss, insulation was placed around all exposed surfaces of the reactor except for the graduated cylinder side of the Dean-Stark Trap. After 15 minutes of heating, the reaction temperature had reached 42° C. and the set point was increased to 225° C. The solution reached 72° C. after 5 minutes at the higher set point. The set point was raised again to 275° C., then 310° C. Reflux occurred at 183° C. five minutes later. The temperature set point was reduced to 280° C., and the solution was held at reflux for 2.0 hours. The initial volume of condensate drained from the Dean-Stark Trap was 19.5 ml. The solution had turned to a "tang" orange color.

During the reflux hold, the temperature was held at 185° C. by reducing the temperature set point to 250° C. At the end of 2.0 hours, the set point was reduced to 19° C. The system was poured into a glass dish 15 minutes later at a temperature of 171° C. The solution gelled immediately after being poured so 1500 ml (83.264 moles) of water were used to rinse the reactor of residue. The total condensate volume collected once the reactor had cooled was 47.4 ml. The system resembled a bright yellow, rubber like slurry.

The polyimide slurry was then vacuum filtered using a large Buchner funnel, suction filtration flask, and vacuum pump. To thoroughly wash the slurry of solvent, extensive measures were taken. First of all, 2 teaspoons of slurry were placed in a blender with 300 ml (16.653 moles) of water and blended. After pouring the blender's contents into the funnel, an additional 1.0 L (55.509 moles) of water was used to wash the blender and the filtered powder. The filtered powder was very granular and light yellow in color.

The powder was transferred from the Buchner funnel into another glass dish and placed in an air-recirculating oven to dry. The oven was gradually ramped up to 200° C. and then held at that temperature for 4 hours. The dried powder was then ground and placed in a plastic bag. Approximately 192 grams of polyimide powder were recovered. The polyimide powder was either resin transfer molded into carbon fiber reinforced composites, or compression molded into neat resin specimens.

Example 36
MP-8 Polyimide Oligomeric Powder Synthesis Procedure

The synthesis procedure outlined in Example 35 was also used to synthesize the MP-8 system, except that BIS-M was substituted in place of BIS-P.

A total of 1148.4 grams (11.886 moles) of NMP solvent was needed throughout the procedure, while 68.20 grams (0.198 moles) of BIS-M were required along with 21.40 grams (0.198 moles) of paraphenylenediamine. The BPDA mass (117.70 grams, 0.400 moles) was added next which caused an exothermic reaction that increased the solution temperature to 62° C.

The next morning the solution was heated to reflux (173° C.). During the reflux hold, 51.3 ml of reaction by-products were collected. The solution was then poured into a glass dish at 158° C. The solution was given several days to precipitate before it was filtered, dried and ground.

Example 37
MP-3L Polyimide Oligomeric Powder Synthesis Procedure

The synthesis procedure outlined in Example 35 was also used to synthesize the MP-3L system, except that PMDA was substituted in place of BPDA and 100% Bisaniline-P was used.

A total of 792.18 grams (8.000 moles) of NMP solvent was needed throughout the procedure, while 85.27 grams (0.248 moles) of BIS-P were required. The PMDA mass (54.531 grams, 0.250 moles) was added next which caused an exothermic reaction that increased the solution temperature to 70° C.

The next morning the solution was heated to reflux (187° C.). During the reflux hold, 3.8 ml of reaction by-products were collected. The solution was then poured into a glass dish at 173° C. The solution was given several days to precipitate before it was filtered, dried and ground.

Example 38
MP4L Polyimide Oligomeric Powder Synthesis Procedure

The synthesis procedure outlined in Example 35 was also used to synthesize the MP-4L system, except that 100% BIS-P was used.

A total of 899.98 grams (9.314 moles) of NMP solvent was needed throughout the procedure, while 85.27 grams (0.248 moles) of BIS-P were required. The BPDA mass (73.56 grams, 0.250 moles) was added next which caused an exothermic reaction that increased the solution temperature to 60° C.

The next morning the solution was heated to reflux (190° C.). During the reflux hold, 3.0 ml of reaction by-products were collected. The solution was then poured into a glass dish at 165° C. The solution was given several days to precipitate before it was filtered, dried and ground.

Example 39

MP-5 Polyinide Oligomeric Powder Synthesis Procedure

The synthesis procedure outlined in Example 35 was also used to synthesize the MP-5 system, except that 100% BIS-M was the diamine used and PMDA replaced BPDA.

A total of 792.18 grams (8.000 moles) of NMP solvent was needed throughout the procedure, while 85.265 grams (0.248 moles) of BIS-M were required. The PMDA mass (54.53 grams, 0.250 moles) was added next which caused an exothermic reaction that increased the solution temperature to 74° C. After mixing the solution for 3.0 hours at a temperature set of 50° C., the solution was heated to reflux (186° C.). During the reflux hold, 3.9 ml of reaction by-products were collected. The solution was then poured into a glass dish at 188° C. The solution was given several days to precipitate before it was filtered, dried and ground.

Example 40

MP-6L Polyimide Oligomerlc Powder Synthesis Procedure

The synthesis procedure outlined in Example 35 was also used to synthesize the MP-6L system, except that 100% BIS-M was the diamine used.

A total of 899.98 grams (9.314 moles) of NMP solvent was needed throughout the procedure while 85.27 grams (0.248 moles) of BIS-M were required. The BPDA mass (73.56 grams, 0.250 moles) was added next which caused an exothermic reaction that increased the solution temperature to 59° C. After mixing the solution for 3.0 hours at a temperature set of 50° C., the solution was heated to reflux (186° C.).

The next morning the solution was heated again to reflux (187° C.) and held for 2.0 more hours. During the reflux hold, 7.2 ml of reaction by-products were collected. The solution was then poured into a glass dish at 133° C. The solution was given several days to precipitate before it was filtered, dried and ground.

The present invention offers several benefits and advantages as discussed in detail above, including, for example, low toxicity, a high glass transition temperature, excellent thermal oxidative stability, and desirable processing characteristics. In further detail, virtually all of the polyimide systems of the invention have a thermal glass transition temperature ($T_g$) of at least 245 degrees Celsius, with many of the systems having a thermal glass transition temperature ($T_g$) of at least 316 degrees Celsius. Moreover, numerous systems show excellent thermal oxidative stability (TOS), losing less than ten percent by weight under conditions of 316 degrees Celsius and 125 pounds per square inch absolute (psia) air pressure for a period of 125 hours, while several other systems lose less than three percent by weight under these same, severe testing conditions.

Given the description presented above of several embodiments of the invention, those of ordinary skill in the art readily will be able to incorporate the inventive polyimide systems in numerous applications, using methods known to such persons. For example, those of ordinary skill will be able to apply the systems in the formation of powders, neat resins, coatings, films, membranes, foams, adhesives, fibers, composites, laminates, prepreg, parts, and bushings.

What is claimed is:

1. A mixture of monomeric reactants, comprising:
   an aromatic dianhydride or a derivative thereof; and
   a diamine selected from the group consisting of 4,4'-[1,4-phenylene-bis(1-menthylethylidene)] bisaniline, 4,4'-[1,3-phenylene-bis(1-methylethylidene)]bisaniline, a derivative thereof, and combinations thereof,
   with the proviso that the mixture not include more than one type of aromatic dianhydride, the mixture not include a diaminosiloxane, and the mixture not include a diaryl substituted acetylene end-capping agent.

2. The mixture of claim 1 wherein the dianhydride is selected from the group consisting of 3,4,3',4'-biphenyltetracarboxylic dianhydride, 3,4,3',4'-benzophenonetetracarboxylic dianhydride, 2,2-bis(3',4'-dicarboxyphenyl)hexafluoropropane dianhydride, pyromellitic dianhydride, 4,4'-oxydiphthalic anhydride, and combinations thereof.

3. The mixture of claim 1 further including an end-capping agent selected from the group consisting of a reactive end-capping agent, a non-reactive end-capping agent, and combinations thereof.

4. The mixture of claim 1 wherein the monomeric reactants are in a solution.

5. An article formed from the mixture of claim 1.

6. The article of claim 5 wherein the article is selected from the group consisting of a powder, a neat resin, a coating material, a film, a membrane, a foam, an adhesive, a fiber, a composite, a laminate, a prepreg, a part, a bushing, and combinations thereof.

7. The article of claim 5 having a thermal glass transition temperature ($T_g$) of at least 245 degrees Celsius.

8. The article of claim 5 having a thermal glass transition temperature ($T_g$) of at least 316 degrees Celsius.

9. The article of claim 5 having a thermal oxidative stability (TOS), as measured by weight-loss, of less than ten percent by weight, under conditions of 316 degrees Celsius and 125 pounds per square inch absolute (psia) air pressure for a period of 125 hours.

10. The article of claim 5 having a thermal oxidative stability (TOS), as measured by weight-loss, of less than three percent by weight, under conditions of 316 degrees Celsius and 125 pounds per square inch absolute psia air pressure for a period of 125 hours.

11. The mixture of claim 1 further including a phenylenediamine.

12. The mixture of claim 11 wherein the phenylenediamine is selected from the group consisting of meta-phenylenediamine, para-phenylenediamine, and combinations thereof.

13. The mixture of claim 11 further including an end-capping agent selected from the group consisting of a reactive end-capping agent, a non-reactive end-capping agent, and combinations thereof.

14. The mixture of claim 11 further including 2,2-bis[4-(4-amninophenoxyl)phenyl]propane or a derivative thereof.

15. The mixture of claim 14 futhffer including 4,4'(1,4-phenylene-bismethylene)bisaniline or a derivative thereof.

16. The mixture of claim 1 further including 2,2-bis[4-(4-aminophenoxyl)phenyl]propane or a derivative thereof.

17. The mixture of claim 16 fiurther including 4,4'(1,4-phenylene-bismethylene)bisaniline or a derivative thereof.

18. The mixture of claim 16 further including an end-capping agent selected from the group consisting of a reactive end-capping agent, a non-reactive end-capping agent, and combinations thereof.

19. The mixture of claim 1 further including 4,4'(1,4-phenylene-bismethylene)bisaniline or a derivative thereof.

20. The mixture of claim 19 further including a phenylenediamine.

21. The mixture of claim 19 further including an end-capping agent selected from the group consisting of a reactive end-capping agent, a non-reactive end-capping agent, and combinations thereof.

22. A mixture of monomeric reactants, the monomeric reactants comprising:
a dianhydride or a derivative thereof;
2,2-bis[4-(4-aminophenoxyl)phenyl]propane or a derivative thereof; and
4,4'(1,4-phenylene-bismethylene)bisaniline or a derivative thereof.

23. The mixture of claim 22 further including a phenylenediamine.

24. The mixture of claim 23 wherein the phenylenediamine is selected from the group consisting of meta-phenylenediamine, para-phenylenediamine, and combinations thereof.

25. The mixture of claim 22 further including an end-capping agent selected from the group consisting of a reactive end-capping agent, a non-reactive end-capping agent, and combinations thereof.

26. An article formed from the mixture of claim 22.

27. A mixture of monomeric reactants, the monomeric reactants comprising:
a dianhydride or a derivative thereof;
2,2-bis[4-(4-aminophenoxyl)phenyl]propane or a derivative thereof; and
a phenylene diamine,
with the proviso that the mixture not include more than two types of diamines.

28. The mixture of claim 27 wherein the phenylenediamine is selected from the group consisting of para-phenylenediamine, meta-phenylenediamine, and combinations thereof.

29. The mixture of claim 27 further including an end-capping agent selected from the group consisting of a reactive end-capping agent, a non-reactive end-capping agent, and combinations thereof.

30. An article formed from the mixture of claim 27.

31. A mixture of monomeric reactants, the monomeric reactants comprising:
a dianhydride or a derivative thereof;
4,4'(1,4-phenylene-bismethylene) bisaniline or a derivative thereof; and
a phenylenediamine.

32. The mixture of claim 31 wherein wherein the phenylenediamine is selected from the group consisting of para-phenylenediamine, meta-phenylenediamine, and combinations thereof.

33. The mixture of claim 31 further including an end-capping agent selected from the group consisting of a reactive end-capping agent, a non-reactive end-capping agent, and combinations thereof.

34. An article formed from the mixture of claim 31.

35. A polyimide-precursor reaction product comprising a polyamic acid or a derivative thereof, formed by a reaction of the monomeric reactants of claim 1.

36. A polyimide formed by a reaction of the polyamic acid or the derivative thereof of claim 35.

37. The polyimide of claim 36 wherein the polyimide has at least a first end and a second end, at least one of the first and second ends including an end cap formed from an end-capping agent.

38. An article formed from the polyimide-precursor reaction product of claim 35.

39. A polyimide-precursor reaction product comprising a polyamic acid or a derivative thereof, formed by a reaction of the monomeric reactants of claim 22.

40. A polyimide formed by a reaction of the polyamic acid or the derivative thereof of claim 39.

41. The polyimnide of claim 40 wherein the polyimide has at least a first end and a second end, at least one of the first and second ends including an end cap formed from an end-capping agent.

42. An article formed from the polyimide-precursor reaction product of claim 39.

43. A polyimide-precursor reaction product comprising a polyamic acid or a derivative thereof, formed by a reaction of the monomeric reactants of claim 27.

44. A polyimide formed by a reaction of the polyamic acid or the derivative thereof of claim 43.

45. The polyimide of claim 44 wherein the polyimide has at least a first end and a second end, at least one of the first and second ends including an end cap formed from an end-capping agent.

46. An article formed from the polyimnide-precursor reaction product of claim 43.

47. A polyimide-precursor reaction product comprising a polyamic acid or a derivative thereof, formed by a reaction of the monomeric reactants of claim 31.

48. A polyimnide formed by a reaction of the polyamnic acid or the derivative thereof of claim 47.

49. The polyimide of claim 48 wherein the polyimide has at least a first end and a second end, at least one of the first and second ends including an end cap formed from an end-capping agent.

50. An article formed from the polyimide-precursor reaction product of claim 47.

51. A method of making a mixture of monomeric reactants, comprising the steps of:
mixing at least one dianhydride or a derivative thereof, at least one diamine or a derivative thereof, a solvent including an alcohol, and a co-solvent including n-methylpyrrolidinone,
the diamine selected from the group consisting of 4,4'-[1,4-phenylene-bis(1-methylethylidene)]bisaniline, 2,2-bis[4-(4-aminophenoxyl)phenyl]propane, 4,4'(1,4-phenylene-bismethylene)bisaniline, and combinations thereof,
the co-solvent present in an amount sufficient to dissolve the diamine or the derivative thereof.

52. The method of claim 51 wherein the co-solvent includes ten percent or less by weight of n-methylpyrrolidinone.

53. A method of enhancing the glass transition temperature ($T_g$) of a polyimide, the polyimide formed from a mixture of monomeric reactants including at least one dianhydride or a derivative thereof and at least one diamine or a derivative thereof, the monomeric reactants having a total amount of diamine, comprising the step of:
increasing the molar ratio of a phenylenediamine to the total amount of diamine, thereby enhancing the glass transition temperature ($T_g$) of the polyimide.

54. The method of claim 53 wherein the phenylenediamine is para-phenylenediamine.

55. A mixture of monomeric reactants, comprising:
an aromatic dianhydride or a derivative thereof; and
a diamine selected from the group consisting of 4,4'-[1,4-phenylene-bis(1-methylethylidene)]bisaniline, 4,4'-[1,3-phenylene-bis(1-methylethylidene)]bisaniline, a derivative thereof, and combinations thereof,
with the proviso that the mixture not include 3,4,3',4'-biphenyltetracarboxylic dianhydride, the mixture not include a diaminosiloxane, and the mixture not include a diaryl substituted acetylene end-capping agent.

56. A mixture of monomeric reactants, comprising:

an aromatic dianhydride or a derivative thereof; and a diamine selected from the group consisting of 4,4'-[1,4-phenylene-bis(1-methylethylidene)]bisaniline, 4,4'-[1,3-phenylene-bis(1-methylethylidene)]bisaniline, a derivative thereof, and combinations thereof, with the proviso that the mixture not include a diamine having an ether linkage in the diamine backbone, and the mixture not include a diaryl substituted acetylene end-capping agent.

57. A mixture of monomeric reactants, the monomeric reactants comprising:

a dianhydride or a derivative thereof;

2,2-bis[4-(4-aminophenoxyl)phenyl]propane or a derivative thereof;

and a phenylene diamine, with the proviso that the mixture not include 4,4'-diaminobenzanilide.

* * * * *

UNITED STATES PATENT AND TRADEMARK OFFICE
CERTIFICATE OF CORRECTION

PATENT NO. : 6,184,333 B1
DATED : February 6, 2001
INVENTOR(S) : Robert A. Gray

Page 1 of 4

It is certified that error appears in the above-identified patent and that said Letters Patent is hereby corrected as shown below:

Title page,
ABSTRACT, "dia-nhdride" should be -- dianhydride --.

Column 1,
Line 37, "polyimnide" should be -- polyimide --.
Line 42, "(polymerization" should be -- (Polymerization --.
Line 52, "diarine" should be -- diamine --.

Column 2,
Line 40, "most ofthe" should be -- most of the --.
Line 50, "bis-nadimnide" should be -- bis-nadimide --.
Line 63, "NASA-Lewis Research Center" should be -- NASA Research Center --.

Column 3,
Line 35, "diamnine" should be -- diamine --.

Column 4,
Line 51, "reading the Detailed" should be -- reading of the Detailed --.
Line 56, "para-phenylenediarnine;" should be -- para-phenylenediamine; --

Column 5,
Line 8, "Temperature Component" should be -- Temperature Components --.
Line 48, "pyridine, THF, DMF," should be -- pyridine, DMF, --.
Line 54, "cross-linking" should be -- crosslinking --.
Line 56, "and phthalic anhydride (and its acids/esters) are" should be -- is --.

Column 6,
Line 1, "BAAP" should be -- BAPP --.
Line 8, "diamnine" should be -- diamine --.
Line 12, "low-toxicity" should be -- low toxicity --.
Line 20, "phenylenediarine" should be -- phenylenediamine --.
Line 40, "Bisaninine-P" should be -- Bisaniline-P --.
- Lines 39-43, "(ADD IN FNOTE 19) Table I compares the toxicological data of MDA vs. That of Bisanine-P and Bisaniline-M. In addition, the Ames Mutagenicity Assays for Bisaniline-P and Bisaniline-M were negative with and without metabolic activation. (ID)" should be -- In addition, the Ames Mutagenicity Assays for Bisaniline-P and Bisaniline-M were negative with and without metabolic activation. Table I compares the toxicological data of MDA vs. that of Bisaninine-P [should be -- Bisaniline --] and Bisaniline-M. --.
Line 66, "BPDA is a moderately priced dianhydride with good" should be -- BPDA offers good --.

UNITED STATES PATENT AND TRADEMARK OFFICE
CERTIFICATE OF CORRECTION

PATENT NO. : 6,184,333 B1
DATED : February 6, 2001
INVENTOR(S) : Robert A. Gray

It is certified that error appears in the above-identified patent and that said Letters Patent is hereby corrected as shown below:

Column 7,
Line 2, "structuire" should be -- structure --.
Line 10, "purchased in commercial in commercial quantities" should be -- purchased in commercial quantities --.
Line 18, "Chriskev company" should be -- Chriskev Company --.
Line 19, "polyuimide" should be -- polyimide --.
Line 41, "Mechnaical" should be -- Mechanical --.
Line 45, "contents" should be -- content --.

Column 8,
Line 15, "50/50% BTDA/BPDA & 30% PPDA/10% MPDA/" should be -- 50/50% BTDA/BPDA & 30% PPDA/10% MPDA --.
Line 26, "MW-1 700" should be -- MW-1700 --.
Line 35, "cosolvent" should be -- co-solvent --.
Line 38, "(56% methanol30% NMP" should be -- (56% methanol/30% NMP --.
Line 46, "hold for one our" should be -- hold for one hour --.
Line 48, "temperatuer" should be -- temperature --.
Line 52, "air re-circulating" should be -- air-recirculating --.
Lines 54-55, "at New Hampshire Ball Bearing and Cincinnati Test Laboratories." should be -- at New Hampshire Ball Bearing (NHBB) and Cincinnati Test Laboratories (CTL). --.
Line 63, "BAX" should be -- BIAX --.
Line 67, "all of the bushing were" should be -- all of the bushings were --.

Column 9,
Line 3, "temperatuer" should be -- temperature --.
Lines 36-37, "and Cincinnati Testing Laboratories (CTL)." should be -- and (CTL) [should be -- CTL --] --.
Line 56, "fovorable" should be -- favorable --.

Column 10,
Line 7, "The affects on" should be -- The effect on --.
Line 16, "GAX" should be -- BAX --.
Line 29, "a=31 6° C." should be -- a 316° C. --.
Line 30, "datga" should be -- data --.
Line 35, "polyirnide" should be -- polyimide --.
Line 39, "temperatuer" should be -- temperature --.
Line 44, "industry. In" should be -- industry. (Detailed synthesis procedures have been provided in the invention examples.) In --.
Line 50, "polyimnide" should be -- polyimide --.

UNITED STATES PATENT AND TRADEMARK OFFICE
CERTIFICATE OF CORRECTION

PATENT NO. : 6,184,333 B1
DATED : February 6, 2001
INVENTOR(S) : Robert A. Gray

It is certified that error appears in the above-identified patent and that said Letters Patent is hereby corrected as shown below:

Column 11,
Lines 15, 49 and 51, "Tg's" should be -- Tgs --.
Line 40, "completed" should be -- conducted --.
Line 43, "polyiride" should be -- polyimide --.
Line 47, "above" should be -- earlier --.
Line 54, "weight4oss" should be -- weight-loss --.
Line 66, "BIP-19" should be -- BIP-16 --.

Column 12,
Line 35, "cross-linking" should be -- crosslinking --.
Lines 60-61, "50% MPDA" should be -- 50% PPDA:50%MPDA --.

Column 13,
Line 7, "PMDA/" should be -- PMDA --.
Line 10, "50% BIS-P:50% p-PDA" should be -- 50% BIS-P:50% p- --.
Line 11, "50% Bis-M:50% p-PDA" should be -- 50% Bis[—BIS—]-M:50% p- --.

Column 14,
Line 30, "SOLUON" should be -- SOLUTION --.
Line 32, "The six formulations" should be -- The five formulations --.
Line 37, "BTDA anhydride" should be -- BTDA (or BTDA/BPDA mixture) anhydride --.
Line 48, "from the start or reflux" should be -- from the start of reflux --.
Line 54, "100°C" should be -- 110°C --.
Line 62, "250 mL" should be -- 250 ml --.
Line 67, to column 15, line 1, "ester (NON-EXCLUSIVE) addition" should be -- ester addition --.

Column 15,
Line 19, "BTDA anhydride" should be -- BTDA (NON EXCLUSIVE) anhydride --.
Line 28, "solution tool 15-25 minutes" should be -- solution took 15-25 minutes --.
Line 52, " (NE) addition" should be -- (NE) (NON_EXCLUSIVE) addition --.
Line 61, "after the resin was collection" should be -- after the resin was collected --.

Column 30,
Lines 16, 36 and 64, "Dean-Stark trap" should be -- Dean-Stark Trap --.
Line 48, "star configuration The" should be -- star configuration. The --.
Line 49, "NASA-Lewis Research Center" should be -- NASA Lewis Research Center --.

UNITED STATES PATENT AND TRADEMARK OFFICE
CERTIFICATE OF CORRECTION

PATENT NO. : 6,184,333 B1
DATED : February 6, 2001
INVENTOR(S) : Robert A. Gray

It is certified that error appears in the above-identified patent and that said Letters Patent is hereby corrected as shown below:

Column 31,
Line 67, "rubber like" should be -- rubber-like --.

Column 32,
Line 28, "paraphenylenediamine." should be -- PPDA. --.
Line 41, "Bisaniline-P" should be -- BIS-P --.
Line 56, "MP4L" should be -- MP-4L --.

Column 33,
Line 5, "Polyinide" should be -- Polyimide --.
Line 22, "Oligomerlc" should be -- Oligomeric --.

Claim 1,
Line 4, "menthylethylidene" should be -- methylethylidene --.
Line 4, "4,4-" should be -- 4,4' --.

Claim 10,
Line 4, "pounds per square inch absolute psia air" should be -- pounds per square inch (psia) air --.

Claim 15,
Line 1, "futhffer" should be -- further --.

Claim 17,
Line 1, "fiurther" should be -- further --.

Claim 32,
Line 1, "wherein wherein" should be -- wherein --.

Signed and Sealed this

Second Day of April, 2002

*Attest:*

JAMES E. ROGAN
*Attesting Officer*     *Director of the United States Patent and Trademark Office*